United States Patent
Egilsson et al.

(10) Patent No.: US 7,016,910 B2
(45) Date of Patent: Mar. 21, 2006

(54) INDEXING, REWRITING AND EFFICIENT QUERYING OF RELATIONS REFERENCING SEMISTRUCTURED DATA

(75) Inventors: Agust Sverrir Egilsson, Palo Alto, CA (US); Hakon Gudbjartsson, Reykjavik (IS)

(73) Assignee: deCODE genetics ehf., Reykjavik (IS)

( * ) Notice: Subject to any disclaimer, the term of this patent is extended or adjusted under 35 U.S.C. 154(b) by 448 days.

(21) Appl. No.: 10/316,986

(22) Filed: Dec. 10, 2002

(65) Prior Publication Data

US 2003/0120642 A1    Jun. 26, 2003

Related U.S. Application Data

(63) Continuation-in-part of application No. 10/216,670, filed on Aug. 8, 2002, now Pat. No. 6,970,874, which is a continuation-in-part of application No. 09/475,436, filed on Dec. 30, 1999, now Pat. No. 6,434,557.

(51) Int. Cl.
G06F 17/30    (2006.01)

(52) U.S. Cl. .................... 707/101; 100/102; 100/104.1
(58) Field of Classification Search ...................... None
See application file for complete search history.

(56) References Cited

U.S. PATENT DOCUMENTS

| | | | |
|---|---|---|---|
| 5,257,365 A | 10/1993 | Powers et al. | |
| 5,608,899 A | 3/1997 | Li et al. | |
| 5,664,172 A | 9/1997 | Antoshenkov | |
| 5,799,300 A | 8/1998 | Agrawal et al. | |
| 5,812,840 A | 9/1998 | Shwartz | |
| 5,822,751 A | 10/1998 | Gray et al. | |
| 5,832,475 A | 11/1998 | Agrawal et al. | |
| 5,890,151 A | 3/1999 | Agrawal et al. | |
| 5,893,104 A | 4/1999 | Srinivasan et al. | |
| 5,905,985 A | 5/1999 | Malloy et al. | |
| 5,918,232 A | 6/1999 | Pouschine et al. | |
| 5,926,818 A | 7/1999 | Malloy | |
| 5,926,820 A | 7/1999 | Agrawal et al. | |
| 5,943,668 A | 8/1999 | Malloy et al. | |
| 5,978,796 A | 11/1999 | Malloy et al. | |
| 6,016,497 A | 1/2000 | Suver | |
| 6,061,676 A | 5/2000 | Srivastava et al. | |
| 6,094,651 A | 7/2000 | Agrawal et al. | |
| 6,115,714 A | 9/2000 | Gallagher et al. | |

(Continued)

FOREIGN PATENT DOCUMENTS

EP    0 965 928 A2    12/1999

OTHER PUBLICATIONS

Nestorov et al., "Extracting Schema From Semistructured Data", SIGMOD Conference 1998, pp. 295-306.*
Harinarayan, V., et al., "Implementing Data Cubes Efficiently," ACM, Jun. 1996 (pp. 205-216).

(Continued)

*Primary Examiner*—Jean M. Corrielus
(74) *Attorney, Agent, or Firm*—Hamilton, Brook, Smith & Reynolds, P.C.

(57) ABSTRACT

The invention discloses methods and apparatus that facilitate efficient querying of tables referencing semistructured data such as digraphs and other domains with complex grouping structure. The invention methods enable meaningful indexing of the tables as well as rewriting of queries with respect to the structures. Dynamic schema extraction using proper coloring algorithms is disclosed that structures the semistructured data in such a way that complex set operations and grouping are replaced with traditional relational joins. This enables a relational database system to harness its entire query optimizing capability when querying tables referencing semistructured data.

30 Claims, 18 Drawing Sheets

U.S. PATENT DOCUMENTS

| | | | |
|---|---|---|---|
| 6,160,549 | A | 12/2000 | Touma et al. |
| 6,240,407 | B1 | 5/2001 | Chang et al. |
| 6,247,008 | B1 | 6/2001 | Cambot et al. |
| 6,289,352 | B1 | 9/2001 | Proctor |
| 6,298,342 | B1 | 10/2001 | Graefe et al. |
| 6,334,182 | B1 | 12/2001 | Merchant et al. |
| 6,366,904 | B1 | 4/2002 | BenHadda et al. |
| 6,397,204 | B1 | 5/2002 | Liu et al. |
| 6,421,656 | B1 | 7/2002 | Cheng et al. |
| 6,421,665 | B1 | 7/2002 | Brye et al. |
| 6,477,525 | B1 | 11/2002 | Bello et al. |
| 6,604,099 | B1 * | 8/2003 | Chung et al. .................. 707/3 |
| 6,654,734 | B1 * | 11/2003 | Mani et al. .................... 707/2 |
| 2002/0120598 | A1 | 8/2002 | Shadmon et al. |
| 2005/0050030 | A1 | 3/2005 | Gudbjartsson et al. |

OTHER PUBLICATIONS

Gray, J., et al., "Data Cube: A Relational Aggregation Operator Generalizing Group-By, Cross-Tab, and Sub-Totals," *Data Mining and Knowledge Discovery*, Kluwer Academic Publishers, The Netherlands, 1997 (p. 29-53).

Saake, G., and Heuer, A., "Datenbanken: Implementierungstechniken," *MITP-Verlag*, App. Publ., pp. 306-309 (1999).

Lenz, Hans-J. and Shoshani, Arie, "Summarizability in OLAP and Statistical Data Bases," *Proc. of the International Conference on Scientific and Statistical Database Management*, 1997 (p. 132-143).

Mumick, I.S., et al., "Maintenance of Data Cubes and Summary Tables in a Warehouse." *ACM Proceedings of Sigmod, International Conference on Management of Data*, 26 (2), 1997 (p. 100-111).

Codd, E.F. et al., "Providing OLAP to User-Analysts: An IT Mandate," E. F. Codd Associates (1993).

Codd, E.F., "A Relational Model of Data for Large Shared Data Banks," *Communications of the ACM, 13* (6) : 377-387 (1970).

Agrawal, R. et al., "Modeling Multidimensional Databases," Research Report, IBM Almaden Research Center.

Ramakrishnan, R. et al., *Database Management Systems*, McGraw-Hill (1998).

Singh, H.S., *Data Warehousing: Concepts, Technologies, Implementations, and Management*, Prentice Hall PTR (1998).

Chaudhuri, S. and D. Umeshwar, "An Overview of Data Warehousing and OLAP Technology," *SIGMOD Record, Association for Computing Machinery*, 26(1):65-74, Mar. 1997.

International Search Report—PCT/US00/33983, Dec. 23, 2003, 2 pp.

* cited by examiner

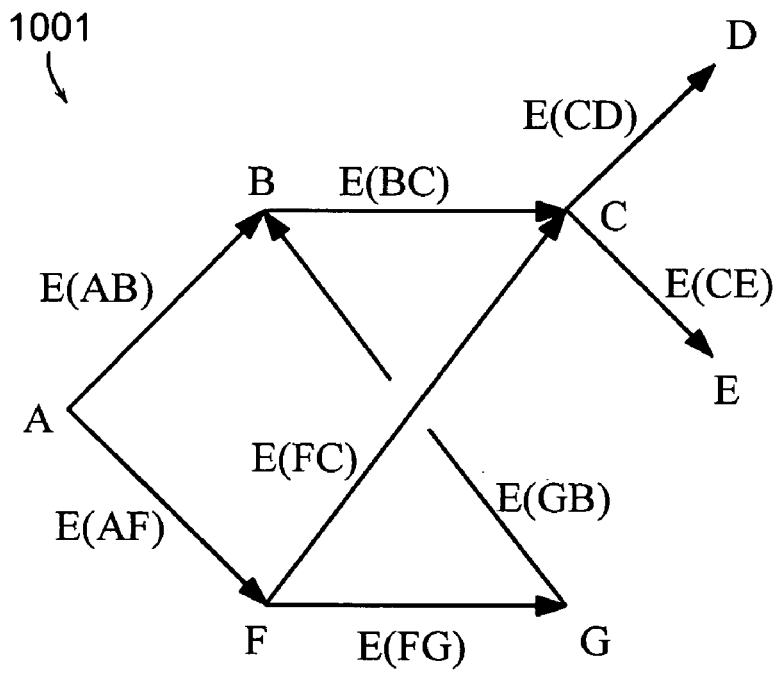
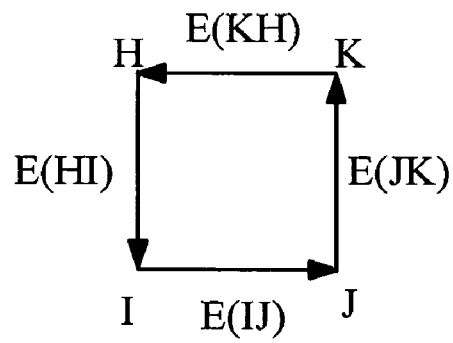
FIG. 1

2001

| Source | Edge | Target |
|--------|-------|--------|
| A | E(AB) | B |
| A | E(AF) | F |
| B | E(BC) | C |
| C | E(CD) | D |
| C | E(CE) | E |
| F | E(FC) | C |
| F | E(FG) | G |
| G | E(GB) | B |
| H | E(HI) | I |
| I | E(IJ) | J |
| J | E(JK) | K |
| K | E(KH) | H |

2002

```
<?xml version="1.0" encoding="ISO-8859-1" ?>
- <graph>
    - <edge e="E(AB)">
        <source>A</source>
        <target>B</target>
      </edge>
    + <edge e="E(AF)">
    + <edge e="E(BC)">
    + <edge e="E(CD)">
    + <edge e="E(CE)">
    + <edge e="E(FC)">
    + <edge e="E(FG)">
    + <edge e="E(GB)">
    + <edge e="E(HI)">
    + <edge e="E(IJ)">
    + <edge e="E(JK)">
    + <edge e="E(KH)">
  </graph>
```

FIG. 2

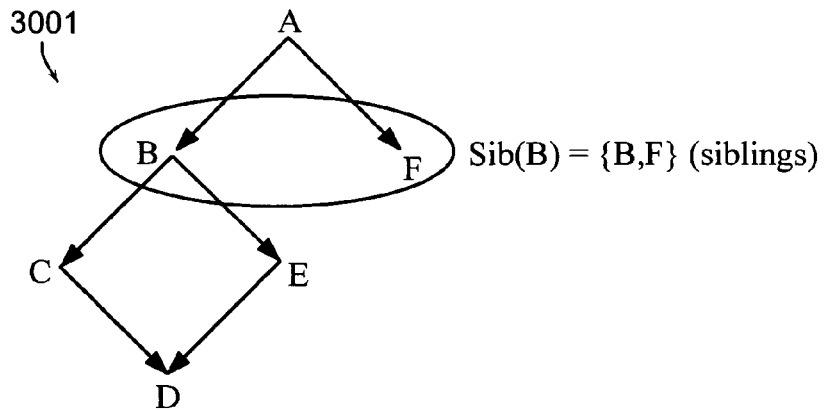
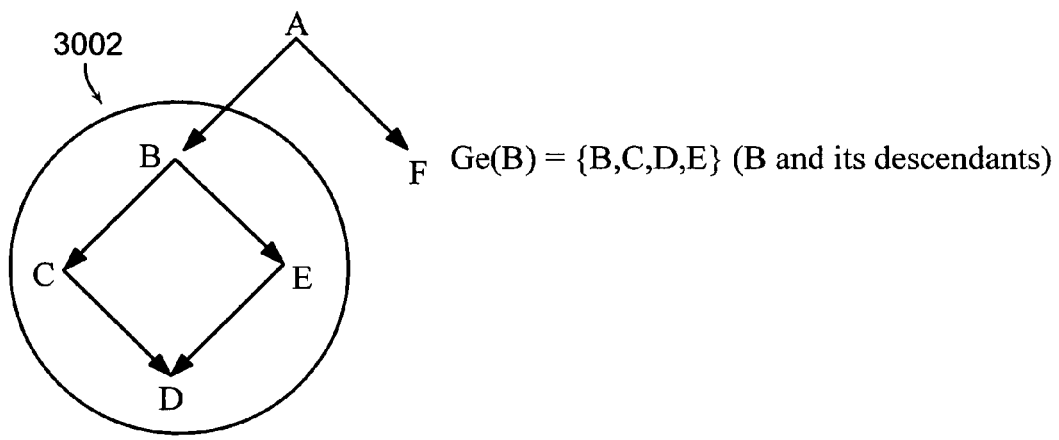
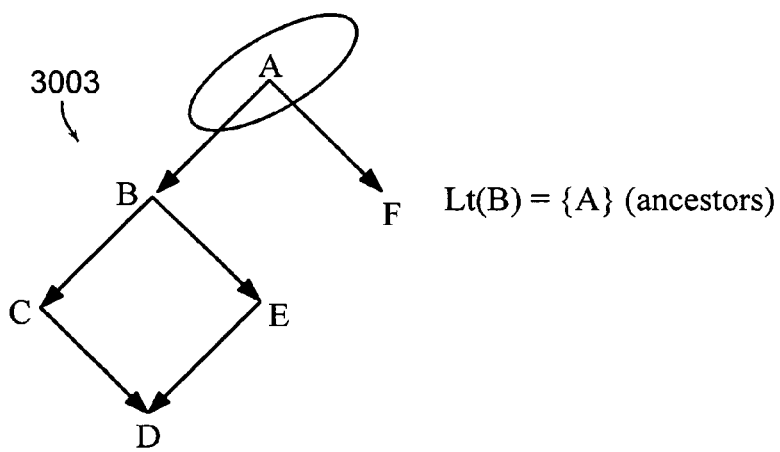
FIG. 3

Color(Ge)   11001

| D | C |
|---|---|
| N – 1 | 1 |
| N – 2 | 2 |
| N – 3 | 3 |
| N – 4 | 4 |
| N – 12 | 3 |
| N – 13 | 2 |
| N – 14 | 2 |
| N – 23 | 1 |
| N – 24 | 1 |
| N – 34 | 1 |

Clique(Ge)   11002

| Node | C1 | C2 | C3 | C4 |
|---|---|---|---|---|
| N – 1 | N – 1 | | | |
| N – 2 | | N – 2 | | |
| N – 3 | | | N – 3 | |
| N – 4 | | | | N – 4 |
| N – 12 | N – 1 | N – 2 | N – 12 | |
| N – 13 | N – 1 | N – 13 | N – 3 | |
| N – 14 | N – 1 | N – 14 | | N – 4 |
| N – 23 | N – 23 | N – 2 | N – 3 | |
| N – 24 | N – 24 | N – 2 | | N – 4 |
| N – 34 | N – 34 | | N – 3 | N – 4 |

FIG. 11

Clique(Gt) 12001

| Node | C1 | C2 | C3 | C4 |
|---|---|---|---|---|
| N–1 | | | | |
| N–2 | | | | |
| N–3 | | | | |
| N–4 | | | | |
| N–12 | N–1 | N–2 | | |
| N–13 | N–1 | | N–3 | |
| N–14 | N–1 | | | N–4 |
| N–23 | | N–2 | N–3 | |
| N–24 | | N–2 | | N–4 |
| N–34 | | | N–3 | N–4 |

Clique(Le) 12002

| Node | C1 | C2 | C3 | C4 |
|---|---|---|---|---|
| N–1 | N–1 | N–12 | N–13 | N–14 |
| N–2 | N–2 | N–12 | N–24 | N–23 |
| N–3 | N–3 | N–34 | N–13 | N–23 |
| N–4 | N–4 | N–34 | N–24 | N–14 |
| N–12 | | N–12 | | |
| N–13 | | | N–13 | |
| N–14 | | | | N–14 |
| N–23 | | | | N–23 |
| N–24 | | | N–24 | |
| N–34 | | N–34 | | |

FIG. 12

Clique(Lt) 13001

| Node | C1 | C2 | C3 |
|------|------|------|------|
| N–1  | N–12 | N–13 | N–14 |
| N–2  | N–12 | N–24 | N–23 |
| N–3  | N–34 | N–13 | N–23 |
| N–4  | N–34 | N–24 | N–14 |
| N–12 |      |      |      |
| N–13 |      |      |      |
| N–14 |      |      |      |
| N–23 |      |      |      |
| N–24 |      |      |      |
| N–34 |      |      |      |

Ge – "Multicolor" 13002

| Node | Q1 | Q2 | Q3 |
|------|------|------|------|
| N–1  |      |      | N–1  |
| N–2  |      |      | N–2  |
| N–3  |      |      | N–3  |
| N–4  |      |      | N–4  |
| N–12 | N–12 | N–1  | N–2  |
| N–13 | N–13 | N–1  | N–3  |
| N–14 | N–14 | N–1  | N–4  |
| N–23 | N–23 | N–2  | N–3  |
| N–24 | N–24 | N–2  | N–4  |
| N–34 | N–34 | N–3  | N–4  |

FIG. 13

INDEXING, REWRITING AND EFFICIENT QUERYING OF RELATIONS REFERENCING SEMISTRUCTURED DATA

RELATED APPLICATIONS

This application is a continuation-in-part of U.S. application Ser. No. 10/216,670, filed Aug. 8, 2002 now U.S. Pat. No. 6,970,874, which is a continuation-in-part of U.S. application Ser. No. 09/475,436 filed Dec. 30, 1999 now U.S. Pat. No. 6,434,557. The entire teachings of these applications are incorporated herein by reference.

BACKGROUND OF THE INVENTION

The invention relates in general to database systems, and in particular, to a method and apparatus for indexing and efficiently querying relations referencing semistructured data in a database system.

Overview of the Related Art

Semistructured data is described using basic graph theory. Atomic or object values are referred to as nodes and the structure is presented as a graph or a function mapping each node to a subset of nodes. The term semistructured data is misleading in many cases, but nevertheless appears accepted. On the one hand it refers to data that is easily imported into a traditional relational database. On the other hand, the schema used to store it is usually not very efficient or intuitive when analyzing its content, e.g., a text column storing program code does not reveal much of the functionality, in other words, structure, of the programs stored in the column.

Semistructured data, such as cyclic and acyclic digraphs are frequently used in the natural and life sciences. Large sets of measurements, many generated by automated processes and robots, reference some of these digraphs. In particular, this is the case in research relating to genomics, proteomics and biology in general. The graphs describe, for example, enzyme, gene and protein interactions, gene relations, gene locations, molecular functions, biological processes and cellular components. Most of the graphs are neither regular nor hierarchical tree structures and are not adequately supported in current database systems.

Semistructured data of another kind includes trees in the form of XML documents. XML documents are sometimes mapped to structured relational schemas in relational databases or kept in a format representing the trees directly in native XML database systems. Semistructured data is also evident on the internet where web pages reference each other in different ways.

Scientific, governmental and industry consortiums generate standards in the form of digraphs such as the Gene Ontology digraph, ICD-9 and ICD-10 medical naming convention, SNOMED and so on. Data is then associated with these classifications and a complex semistructured dataset emerges. Geneology records may be considered semistructured and moreover scientific work relating to the exploration of the human and other genomes has produced massive data that cross-references complex graphs and structures.

Indexing of semistructured tree data is being addressed by all the major database vendors in one form or another, such as is evident both in the DB2 database system from IBM and in Oracle's database system. A particular emphasis is on, efficiently, indexing XML documents and on, efficiently, accessing heterogeneous datasets with little or no schema structure. Many research projects have also addressed indexing of semistructured data and some are described in the book "Data on the Web, From Relations to Semistructured Data and XML" by Serge Abiteboul, Peter Buneman and Dan Suciu published by Morgan Kaufmann Publishers, 2000. The book also contains numerous references to projects involving semistructured data.

The patent by Chang et al. (U.S. Pat. No. 6,240,407 B1, Method and Apparatus for Creating an Index in a Database System) describes document abstractions and summarization. The patent by Cheng et al. (U.S. Pat. No. 6,421,656 B1, Method and Apparatus for Creating Structure Indexes for a Data Base Extender) describes methods for storing and querying structured documents internally as large objects or externally as files. The patent by Srinivasan et al. (U.S. Pat. No. 5,893,104, Method and System for Processing Queries in a Database System using Index Structures that are not Native to the Database System) describes registering and generating routines for managing non-native index structures. The patent application by Shadmon et al. (U.S. 2002/0120598 A1, Encoding Semi-Structured Data for Efficient Search and Browse) describes indexing techniques used to encode XML tree data into strings that enable indexing of the XML data. The patent by Bello et al. (U.S. Pat. No. 6,477,525 B1, Rewriting a Query in Terms of a Summary Based on One-to-One and One-to-Many Losslessness of Joins) describes query rewriting methods for utilizing materialized views for aggregation.

SUMMARY OF THE INVENTION

The invention at hand discloses methods that facilitate indexing of tables referencing semistructured data. The methods use information in the form of functions that define variable subsets of nodes, to extract schema structure from the data. The schema structure is then used to optimize access to the data for queries utilizing the functions. The functions may be digraph related such as the descendants function associated with any digraph or any other function that can be efficiently determined using the digraph structure, including path expressions. The functions may also be entered simply as conditional functions or conditional expressions using several variables. The functions are referred to as being set valued. The algorithms disclosed efficiently extract schema information from the set valued functions or digraphs and their nodes and build schema objects enabling further indexing or in-memory operations. The extracted schema is joined with a table or an object referencing the nodes and in turn the referencing table or object inherits enough structural information for it to be efficiently indexed using standard database indexing technologies.

In order to overcome limitations in the prior art, the present invention discloses methods and apparatus supporting indexing of tables and objects referencing semistructured data. For relations referencing one or more simple, regular and hierarchical tree digraphs, efficient optimization techniques exist for data warehouses supporting grouping operations. A particularly efficient, but limiting, setup is obtained by building a star schema containing a large fact table joined with small dimension tables. The invention goes beyond current relational database techniques, in that the methods disclosed enable and automate the use of best-of-breed relational optimization methods, for relations referencing any kind of semistructured data, e.g., expressions and cyclic or acyclic digraphs. In order to achieve this, efficient proper coloring algorithms are introduced and eventually used to extract a relation, denoted by Clique(F), from the semistructured data. The Clique(F) relation captures the access benefits of using dimension tables in relational databases without suffering from the limitations of current designs.

An object of the present invention is to disclose methods to extract and maintain useful schema information based on set valued functions realized in a database system. It is a further object of the invention to disclose efficient methods that may be used to build and maintain indexes, including bitmap indexes, on tables referencing semistructured data, providing pointers from each node to all rows containing derived nodes in the table. Wherein, the derived nodes are determined by set valued functions, i.e., conditional expressions, conditional functions, digraph structures and path expressions.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 illustrates an example of a digraph.

FIG. 2 shows a digraph represented in two different database formats.

FIG. 3 shows a digraph and several of the possible set valued functions supported by the digraph.

FIG. 11 displays the result of a proper coloring and a particular schema extraction for the digraph of FIG. 9.

FIG. 12 and FIG. 13 display other schemas extracted with respect to different set valued functions and extraction methods for the digraph of FIG. 9 used to exemplify the invention routines (algorithms).

DETAILED DESCRIPTION OF THE INVENTION

Figure 4:
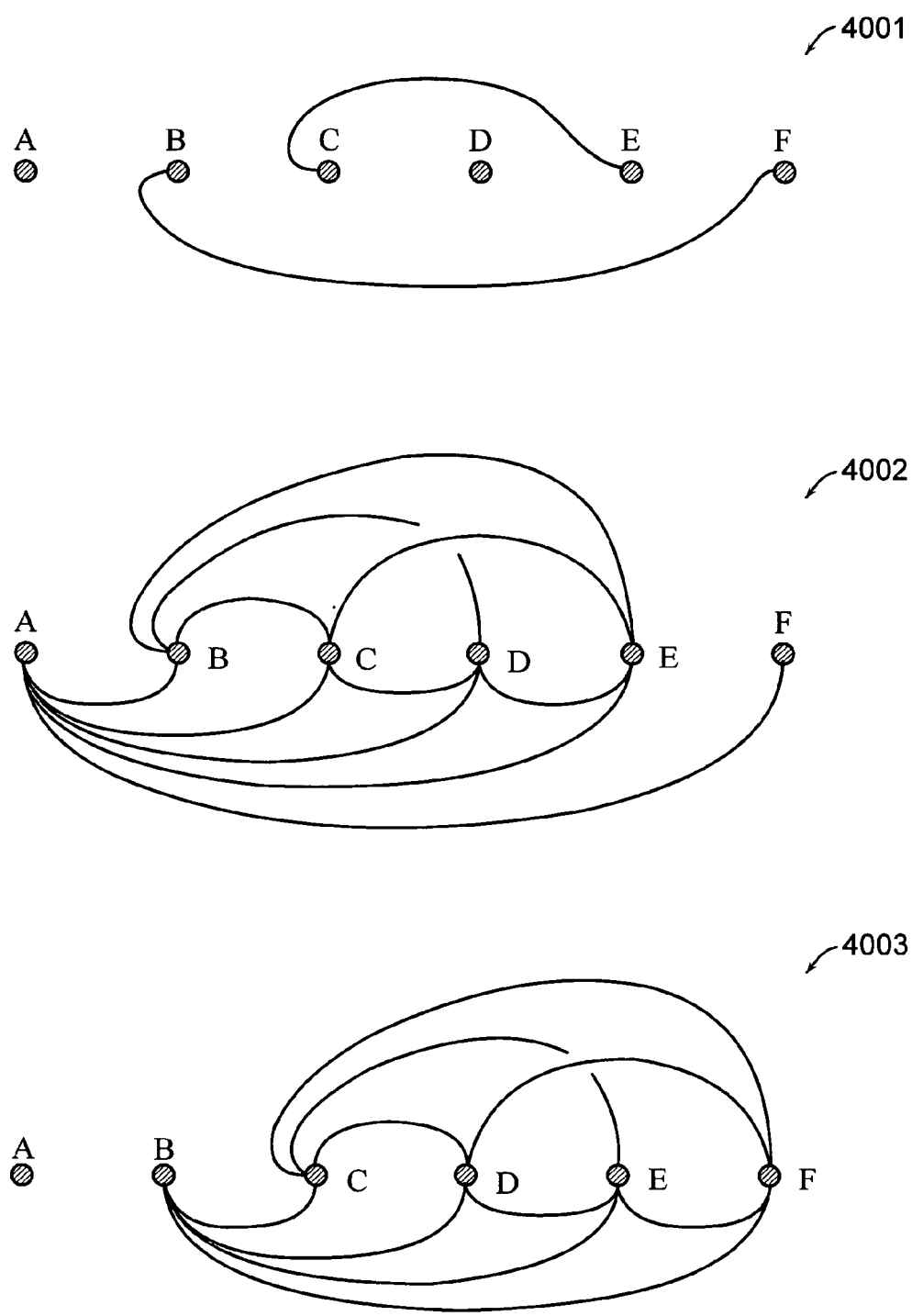
FIG. 4 illustrates induced intersection graphs associated with the set valued functions exemplified in FIG. 3 according to the principles of the present invention.

A description of preferred embodiments of the invention follows.

The following description of the preferred embodiment is to be understood as only one of many possible embodiments allowed by the scope of the present invention. Reference is made to the accompanying figures, which form a part hereof.

Terminology (Graphs).

One aspect of the invention deals with finite graphs. Some of the terminology for finite graphs is listed below but a more complete list of definitions and theory may be found in the book: Introduction To Graph Theory, Second Edition by Douglas West and published by Prentice Hall (2001). Another reference is the text by Serge Abiteboul, Peter Buneman and Dan Suciu, "Data on the Web, From Relations to Semistructured Data and XML" published by Morgan Kaufmann Publishers (2000).

1. A graph consists of a set of nodes (vertices), N and a set of edges, E, where each edge designates two nodes, called endpoints of the edge. The endpoints of an edge may be the same node. The graph is directed and called a digraph if the endpoints of edges are ordered. Each edge in a digraph, e in E, has a source node, s(e), and a target node, t(e), also referred to as tail and head, respectively.
2. A graph is called simple if each pair (ordered pair in a digraph) of endpoints is determined by a unique edge.
3. Two nodes are called adjacent if they are the endpoints of an edge. Nodes that are adjacent are also called neighbors. A set of nodes that are pairwise adjacent is called a clique.
4. A path from a node, S, to a node, T, in a digraph is an ordered sequence of one or more edges $e_1, \ldots, e_n$ with $S=s(e_1)$, $t(e_1)=s(e_2), \ldots, t(e_{n-1})=s(e_n)$ and $t(e_n)=T$.
5. A cycle in a digraph is a path from a node to itself. A loop in a graph is an edge whose endpoints are equal.
6. If a digraph has no cycles it is referred to as being acyclic.
7. A k-coloring of a graph is a map from the nodes of the graph to the set of k-integers $\{1, 2, 3, \ldots, k\}$. The k-coloring is called proper if adjacent vertices are assigned different integers (colors). The smallest number k such that the graph has a proper k-coloring is called the chromatic number of the graph.
8. Here the notation Gt(S) of a node, S, in a digraph is used to denote the set of all descendants, i.e., nodes T such that there exists a path from S to T. The notation Ge(S) is used to denote the descendants and additionally the node S itself if it is not already a descendant of itself (i.e., there exists a path from S to S). The set valued function Gt is called, here, the descendants function for the digraph and the set valued function Ge is called, here, the descendants-and-self function for a given digraph. Furthermore, the set valued function mapping a node S to the set of all nodes that are target nodes of edges with source node equal to S is called the target map of the digraph and denoted here by Tg(S). It should be noted that these definitions apply to all digraphs, both cyclic and acyclic.
9. A digraph with a root node is a tree if there is a unique path from the root to each of the other nodes. A tree is necessarily acyclic.

FIG. 1 shows two digraphs 1001 and 1002 that are used to exemplify the notation described in this disclosure of the invention. The digraphs 1001 and 1002 may also be considered as one disconnected digraph. The nodes in the graphs are labeled A, B, C, D, E, F, G, H, I, J and K and the edges by E(ST) where S is the source node and T the target node. The graph 1001 is directed and acyclic whereas the graph 1002 is cyclic. The present invention deals with both cyclic and acyclic digraphs as well as with non-directed graphs and other equivalent forms and representations of data.

Relational/XML Database Representations.

FIG. 2 shows example documents containing descriptions of a digraph. In a relational database, graphs may be stored in tables. One of the many ways this can be achieved is to have each row in a given table represent an edge in a graph. This is, for example, the case with relation (table) 2001. The table 2001 contains a description of the (combined) digraph 1001, 1002 shown on FIG. 1. Table 2001 has columns representing the source node, the target note, and the edge. If the naming of edges is irrelevant the table does not need an edge column and may simply be formed as a binary relation over the nodes representing source and target nodes only. Graphs may also be stored in a computer system as text files or other formats such the XML (Extensible Markup Language) document shown as 2002. The files may be entries in tables in a database or imported into relational databases using the various XML or text mappings into relations. The documents may also be stored in native XML databases or XML extensions of relational databases. For techniques relating to native XML databases see the various vendor specific documents such as documents available from NeoCore's webpage: www.neocore.com. For XML extensions of relational databases see the Oracle or IBM references: Oracle9i XML Database Developer's Guide—Oracle XML DB, Release 2 (9.2) March 2002, Part No. A96620-01 or IBM DB2 Universal Database, XML Extender Administration and Programming, Version 8, Part No. CT19TNA.

Relational database techniques are discussed in the textbook: Database Management Systems, Second Edition by Raghu Ramakrishnan and Johannes Gehrke, published by McGraw-Hill Higher Education. The SQL standard used in relational database systems is defined by documents: ANSI documents, X3.135-1992, "Database Language SQL" and ANSI/ISO/EIS 9075 available from the American National Standards Institute. A practical vendor specific SQL implementation is described by the Oracle reference: Oracle9i, SQL Reference, Release 2 (9.2), March 2002, Part No. A96540-01 available online from Oracle Corporation, Redwood Shores, Calif., and by the DB2 reference: IBM DB2 Universal Database, SQL Reference Volumes 1 & 2, Version 8, SC09-4844-00 & SC09-4845-00, Parts No. CT17RNA & CT17SNA. The invention also makes references to functions defined inside database systems and both SQL references, above, explain how to create and define such functions. Information and specifications relating to the XML standard is available from the World Wide Web Consortium's (W3C) webpage: www.w3c.org.

Search Criteria.

In particular, the present invention applies to the following setup. Given a domain, D, i.e., a set of values, and a function F that maps each value to a set of values in D, i.e., for each d in D the output, F(d), is a subset of D. In a relational database system, this function may be represented in many different ways. One way is a table with two columns: One for values d from the domain and another for elements e from the subsets F(d) of D. In other words, the rows in the table contain entries (d,e) where e is in the subset F(d) of D. Such a table defines a binary relation over D. Mathematically, F is a map from D to the powerset of D, i.e., the set of all subsets of D. It is also common in a relational database system to represent such functions by a number or boolean valued function, say f, defined in the database system in such a way that f(e,d)=1 if e is in the set F(d) and f(e,d)=0 otherwise. This is, for example, a common practice in the Oracle database system. The Oracle database system currently, e.g., version 9.2i, allows users to create specialized index methods for "Domain Indexes" to optimize access to relations about the domains. A reference to the technology used by Oracle includes the Oracle handbook: Oracle9i, Data Cartridge Developer's Guide, Release 2 (9.2), March 2002, Part No. A96595-01. Similarly, IBM's Informix Database supports virtual indexes, see the documentation: Virtual-Index Interface, Programmer's Manual, Version 9.3, August 2001, Part No. 000-8345, IBM's Informix Online Documentation, IBM 2001. A somewhat different, but applicable, approach is available as part of DB2's SQL using a "create index extension" statement, see: IBM DB2 Universal Database, SQL Reference Volumes 2, referenced previously, for full documentation.

The domain D may also be a composed domain so that each element in D is, for example, a vector containing more than one value. This is a standard indexing technique and the disclosure assumes that an element from the domain, usually called D here, may be structured in different ways.

The relation generated by the set valued function F is defined here to be the binary relation over the domain D with entries (d,e) where e is in the set F(d) and d in D. It is referred to as the target relation induced by the set valued function F and denoted by Target(F).

It is an objective of the invention to disclose methods and structures that may be used in a relational database system to optimize queries issued on tables containing a column with values from the domain D and wherein the query is partially or entirely specified, i.e., conditioned, using the function F, represented in the database.

In order to clarify this with an example, consider the gene ontology digraph defined by the gene ontology consortium, see Gene Ontology: tool for the unification of biology. The Gene Ontology Consortium (2000) Nature Genet. 25: 25–29. Assuming one has imported the publicly available gene ontology digraph into the Oracle database one may proceed and define a function, say Ge(e,d), modeling the previously defined descendants-and-self function in such a way that Ge(e,d)=1 if e is d or a descendant of d, and Ge(e,d)=0 otherwise. An example of a relational SQL query, issued on a table, say goTermFact, with a column "acc", containing entries from the gene ontology digraph and specified using the Ge function has the form:

select count(*) from geTermFact where Ge(acc,'GO: 0003824')=1

It counts the number of rows in the table geTermFact where the value of the "acc" column is equal to or a descendant of the node 'GO:0003824' in the gene ontology digraph. The difference between the digraph and the relation induced by the function Ge needs to be, and is, emphasized below.

FIG. 3 shows examples of 3001, 3002, 3003 several possible set valued node functions for a simple digraph evaluated at a particular node, "B". Each of the functions results in a different induced relation. The first example, 3001, demonstrates a function that maps a node to a set determined by the node itself and its siblings (all the nodes have the same parents). The Sib function of Example 3001 is further represented by the induced intersection graph 4001 of FIG. 4. In that graph 4001, each edge shown connects siblings (nodes of the same parent).

Continuing with FIG. 3, the second example shown, 3002, demonstrates a function that maps a node to the descendants-and-self set. The corresponding induced dimension or intersection graph 4002 of FIG. 4 represents the resultant relation of the Ge function of example 3002. In that graph 4002, each edge connects descendant nodes.

The third example 3003, in FIG. 3, demonstrates a function that maps a node to its ancestors set. They induced intersection graph 4003 (FIG. 4) illustrates the corresponding relation resulting from function Lt of example 3003.

Other such set valued node functions include functions that map a node to its descendants only, its ancestors-and-self set only, its parents, its children or in a weighted graph nodes in a similar weight range, of greater/lesser weight and so on. Additional domain attributes, as in the weight examples, allow one to create countless such maps describing the various physical phenomena.

Defining, efficiently, the algorithms required to construct these and other, set valued, node maps, may or may not be a simple task depending on the definition of the function. The books: The Art of Computer Programming, Volume 3, Sorting and Searching, Second Edition by Donald E. Knuth published by Addison-Wesley (1998) and the book Introduction To Graph Theory, Second Edition by Douglas West, referenced previously, may be used as starting points to the prior art of writing efficient such algorithms.

As explained above a domain D, e.g., a finite set of values stored in a database relation, and a set valued function F from D to the powerset of D may be stored in a relational or XML database. In relational databases the function F might be stored or defined by a binary relation over D, i.e., a table with two columns each with values from D. The entries (rows) in the tables are all values of the form (d,e) where e is an element from F(d) and d is in D, as explained above. It has also been explained that the function F may be represented or defined directly as a database function (e.g. using the create function statement), say f, returning numbers or boolean values such that if d and e are values from D then f(e,d)=1 (or TRUE) if e is in F(d) but f(e,d)=0 (or FALSE) otherwise. Yet another alternative is to represent the set valued function by a Boolean condition, e.g., just a string such as "e>d" representing "f(e,d)=1 if e>d, but 0 otherwise". In all of these cases the notation Target(F) or Target(f) may be used. In other words, Target(F) may be regarded as the SQL relation:

select d.d as d, e.d as e from D d, D e where f(e.d, d.d)=1 where D is the domain with the nodes in a "d" column and f is the relational database function or a conditional expression, in the latter case "f(e.d, d.d)=1" is replaced with the expression. If the domain D is large then this may be a very inefficient way to define the relation and therefore any additional information about the function may be useful to increase the efficiency of creating the Target(F) table from f. This additional information may be coded into the database as a specialized index extending the indexing capabilities of the the database system such as implemented in the Oracle9i database and previously mentioned. (Alternatively, a more optimal/self-explanatory notation might be: select d.d as d, e.d as e from D d, D e where e.d IN F(d.d)). The above process is demonstrated by algorithm (routine), 5002 in FIG. 5 in connection with other possible efficient algorithms for creating Target(F) explained below.

Set Valued Functions Induced by Digraphs.

In many cases though the natural way to specify the desired set valued function is to import or define it in the database system using a digraph. For example, given any set valued function F on a domain D, the function F is the target map, Tg, of a digraph obtained by connecting a source node d in D with all the targets in the set F(d). This shows that a target map over a digraph with nodes in D may be used to simulate any such set function. It, and the descendants-and-self function "Ge" as well as the descendants function "Gt" are described in detail below. Equivalently, one can reverse the arrows in the digraph and obtain similar results by describing the "source map", the ancestors-and-self and the ancestors' functions. Another source of set valued functions induced by digraphs comes from using the various path expressions, as will be explained carefully.

Figure 5:
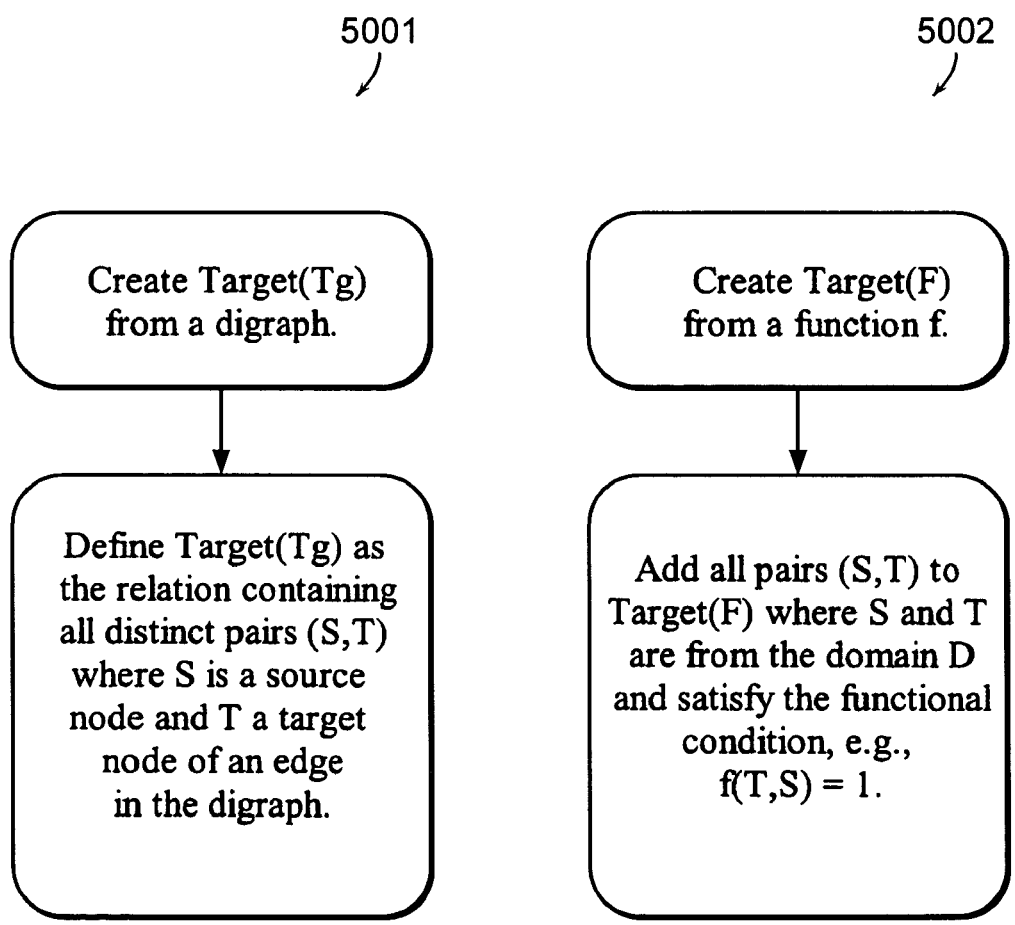
FIG. 5 and FIG. 6 are flow diagrams of the present invention routine for creating the target relations induced by set valued functions.

With reference to FIG. 5 step 5001, given a digraph G represented in a database with nodes from a domain D the induced target relation of the set valued function Tg, denoted by Target(Tg), is obtained as the binary relation (with ordered columns "d" and "e") of all distinct pairs (S,T) where S is a source node and T a target node of an edge in the digraph. This is also the way, in many cases, the original digraph G is realized in the database so no additional work may be required in creating Target(Tg) other than to point to the original digraph.

Creating Target(F) from a function or a logical conditional expression is explained previously. The algorithms 5001 and 5002 on FIG. 5 summarize the steps required to create Target(Tg) and Target(F) from a function or conditional expression.

Figure 6:
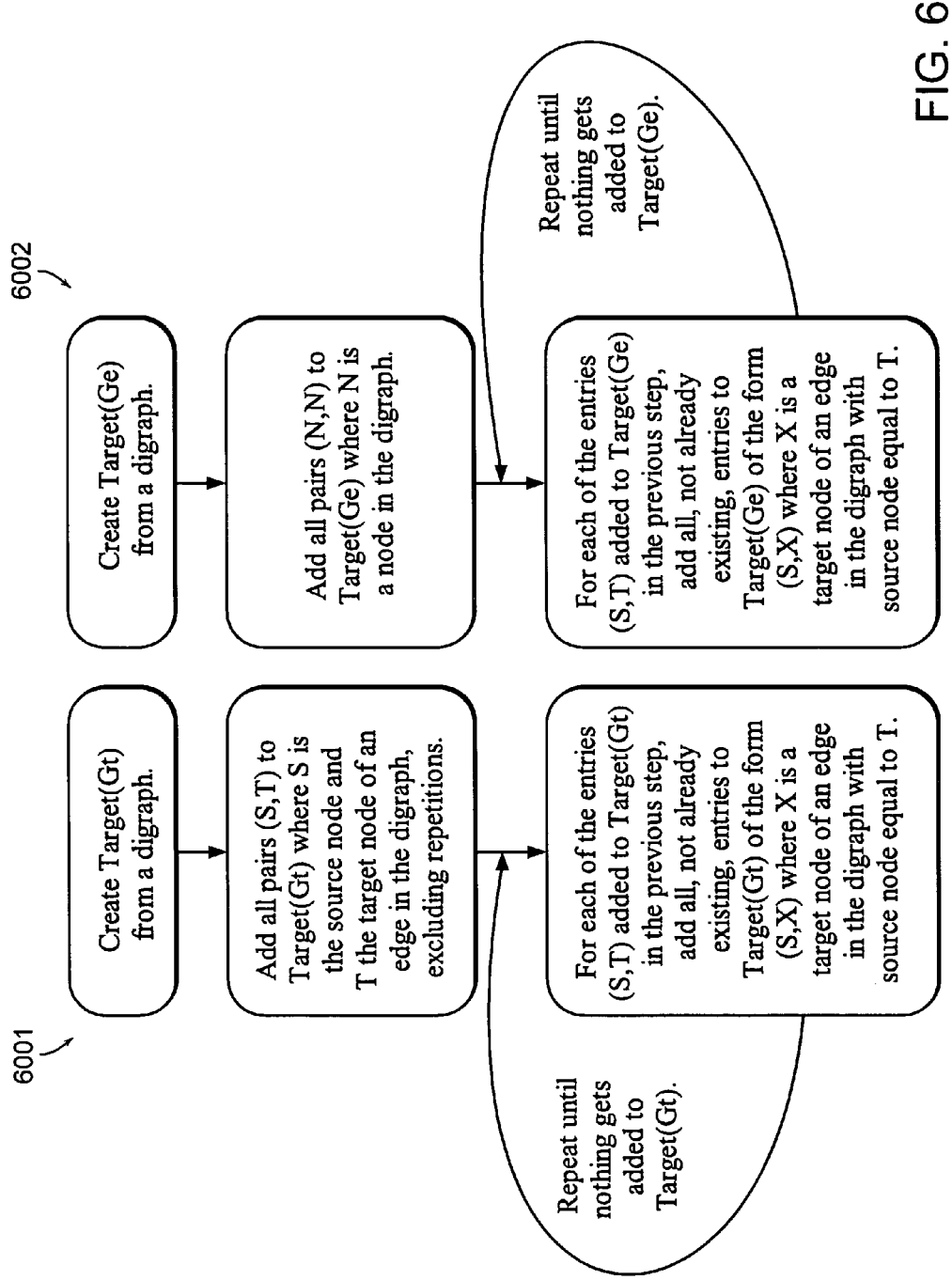

The induced Target(Gt) relation for the digraph induced by the descendants set function (gt above) may be defined by the following algorithm as illustrated at 6001 in FIG. 6.

Target(Gt): Start with an empty Target(Gt) relation with ordered attribute headings "d" and "e". Initialize Target(Gt) by adding all the ordered edge endpoints to Target(Gt), i.e., add all pairs (S,T) where S is the source node of an edge and T is the target node, excluding repetitions of such pairs. The process continues by iterating the following step: For each of the entries (S,T) added to Target(Gt) in the previous step (initialization being the first step) add all, not already existing, entries to Target(Gt) of the form (S,X) where X is a target node of an edge in the digraph with source node equal to T.

The process should be stopped when the foregoing step results in no more additions to the Target(Gt) relation as illustrated at the end loop of 6001 in FIG. 6.

The above algorithm can be efficiently executed in a relational database system supporting simple programming and indexing of (e.g. B-tree) tables. This is the case both with IBM's DB2 and the Oracle database. Similarly it may be efficiently executed in an XML extension or in a native XML database supporting indexing and minimal programming.

If one adds a loop to each node in the digraph then each node becomes a descendant of itself and Gt morphs into Ge. Nevertheless, the search graph for the descendants-and-self function, Ge, over the digraph may be defined by a similar independent algorithm as follows as illustrated at 6002 in FIG. 6.

Target(Ge): Start with an empty Target(Ge) relation with ordered attribute headings "d" and "e" as before. Initialize Target(Ge) by adding all entries of the form (N,N) to Target(Ge) where N is a node in the graph. The process now continues in the same way as before by iterating the following step: For each of the entries (S,T) added to Target (Ge) in the previous step (initialization being the first step) add all, not already existing, entries to Target(Ge) of the form (S,X) where X is a target node of an edge in the digraph with source node equal to T.

Again, this should continue until the foregoing step results in no more additions to the Target(Ge) relation as illustrated at the end loop of 6002 in FIG. 6.

The Target(Ge) relation may additionally be obtained from Target(Gt) by adding all entries of the form (N,N) with N a node in the digraph, not already included in the Target(Gt) relation, i.e., Target(Ge)=Target(Gt) "union" the diagonal line in the cross product of D with itself.

The above two basic algorithms for creating Target(Gt) and Target(Ge) from a digraph are illustrated on FIG. 6 by 6001 and 6002, respectively.

Path Expressions and Filtering.

A rich source of set valued functions is obtained from path expressions. Path expressions are supported in many database systems and can thus be efficiently evaluated using techniques already available in the systems. Path expressions are discussed in the previously mentioned text: Data on the Web, From Relations to Semistructured Data and XML by Serge Abiteboul, Peter Buneman and Dan Suciu. A standard called the XML Path Language (XPath) has been developed for path expressions in XML, within the World Wide Web Consortium. Common, search related, path expressions provide specifications which point to nodes in digraphs. The syntax used for path expressions varies from system to system. As an example, the path expression "d:._*" may be used to specify the descendants-and-self map Ge(d) described previously, and the path expression "d:._._*" may be used to define the descendants set Gt(d) for a given node d. Explicitly, in this example, the expression "d:._._*" results in all nodes that can be reached starting from the node d and following at least one edge in the direction of the digraph, similarly "d:._*" specifies all nodes that can be reached starting from d and following zero or more edges forward in the digraph. The set valued function, F(d), associated with a path expression specified as a function on the domain D, may be defined as explained below and accordingly realized in a database system:

1. Given a path expression, say exp(d), depending on one or more node variables, here denoted by d, let F(d) be the set of nodes specified by the expression, i.e., F(d)={e|e is pointed to by the expression exp(d)}. This case will be denoted by, F(d)=exp(d).
2. Given a path expression, say exp(e,d), depending on two or more node variables, denoted here by e and d, the associated set valued function, F, may also be defined such that the set F(d) is the set of all nodes e, so that exp(e,d) points to at least one node, i.e., F(d)={e|the expression exp(e,d) defines one or more valid nodes in the digraph}. This case will be denoted, F(d)={e|EXISTS(exp (e,d))} and the notation EXISTS(exp(e,d)) is considered a logical expression returning TRUE if and only exp(e,d) defines at least one valid node in the digraph for given nodes d and e.

As a further example, the "geneology" expression, exp (e,d)="e:.mother._*.d:", may be used to specify the set valued function F(d)={e|EXISTS(e:.mother._*.d:)"}. The set F(d) specifies the "mother", "grandmothers" and so on for the node "d".

A database system may provide support for path expressions, in which case the associated set valued function will be efficiently implemented using the supported features and indexing.

Intersection Graphs Induced by Set Valued Function.

For a set valued function F over a domain D, the Target(F) relation induced by F may be efficiently defined in a database system according to the invention, by the above description.

The intersection graph of the set valued function F, denoted by Int(F), is now defined here as follows:
1. Int(F) has nodes from D and is simple.
2. The edges of Int(F) are defined as follows: Two different nodes d1 and d2 are endpoints of an edge if there exists an e in D such that (d1,e) and (d2,e) are in the relation Target(F). Put differently, using the set valued function F directly, this means that d1 and d2 are adjacent if and only if the intersection of F(d1) and F(d2) is nonempty.

In graph theoretical terms, the family of sets F(d), for d in D, forms an intersection representation of the graph Int(F) and thus Int(F) is called the intersection graph of the family of sets, but here calling Int(F) the intersection graph of F will do. The Int(F) graph will also be referred to as the intersection graph induced by Target(F) (and D).

As mentioned above, FIG. 4 shows the intersection graphs for the 3 set valued functions (Sib, Ge, Lt) defined from the examples 3001, 3002, 3003 shown on FIG. 3. The graph Int(Sib) is labeled 4001, the graph Int(Ge) is labeled 4002 and the graph Int(Lt) is labeled 4003. The existence of the edges shown is quickly verified from the illustrations of corresponding functions (Sib, Ge, Lt) in FIG. 3.

Proper Coloring of the Int(F) Graph.

Let F be a set valued function on a domain D, defined directly in the database or through the use of a digraph represented in the database as described above. The proper coloring of the graph Int(F) may be efficiently achieved in a database system. The theory of graph coloring is discussed in the book: Introduction To Graph Theory, Second Edition by Douglas West referenced earlier. Other references include the books: Graph Coloring Problems by Tommy R. Jensen and Bjarne Toft and published by John Wiley & Sons, Inc. (1995) and the text Graph Colouring and the Probabilistic Method by Michael Molloy and Bruce Reed published by Springer Verlag (2002). A discussion about the chromatic number of the graph, Int(Ge), for specific classes of digraphs is contained in the preprint: On vertex coloring simple digraphs by Geir Agnarsson and Agust Egilsson [2002].

In one embodiment, a greedy proper coloring algorithm 7001 is used to color the graph Int(F) by looping over the nodes as follows and illustrated in FIG. 7: Select the nodes from D in some order. For each selected node, d, assign to it the smallest positive integer, k (the color of d), such that none of its neighbors has already been assigned the same color k.

In a more machine/SQL friendly manner the algorithm 7001 may be implemented as follows for the Int(F) graph:
1. Create in the system an empty relation Color(F) to hold pairs (d,c) where the heading "d" denotes a node from D and "c" an integer representing color.
2. Define a virtual relation, called Avoid(F) here, in the database given by: d (an uncolored node) and c (a color) are related if c is the color of a neighbor of d. Using SQL, Avoid(F) is given by:
   "SELECT DISTINCT n1.d AS d, col.c AS c
      FROM Target(F) n1, Target(F) n2, Color(F) col
         WHERE n2.e=n1.e AND col.d=n2.d"
   In order for this query to return efficiently all colors of nodes adjacent to d, indexes may be defined on the Target(F) and the Color(F) relation.
3. Loop over the nodes (d) from the domain D and perform the following two steps 3.1 and 3.2:
   3.1. For each node d in the loop select the smallest integer k, starting from 1, that has not already been assigned as a color to an adjacent node, i.e., the smallest k such that (d,k) is not in Avoid(F), when reevaluated. A current list of colors already used may be obtained by reevaluating and querying Avoid(F) keeping the node fixed as d.
   3.2. Add the entry (d,k) to Color(F).

Figure 7:
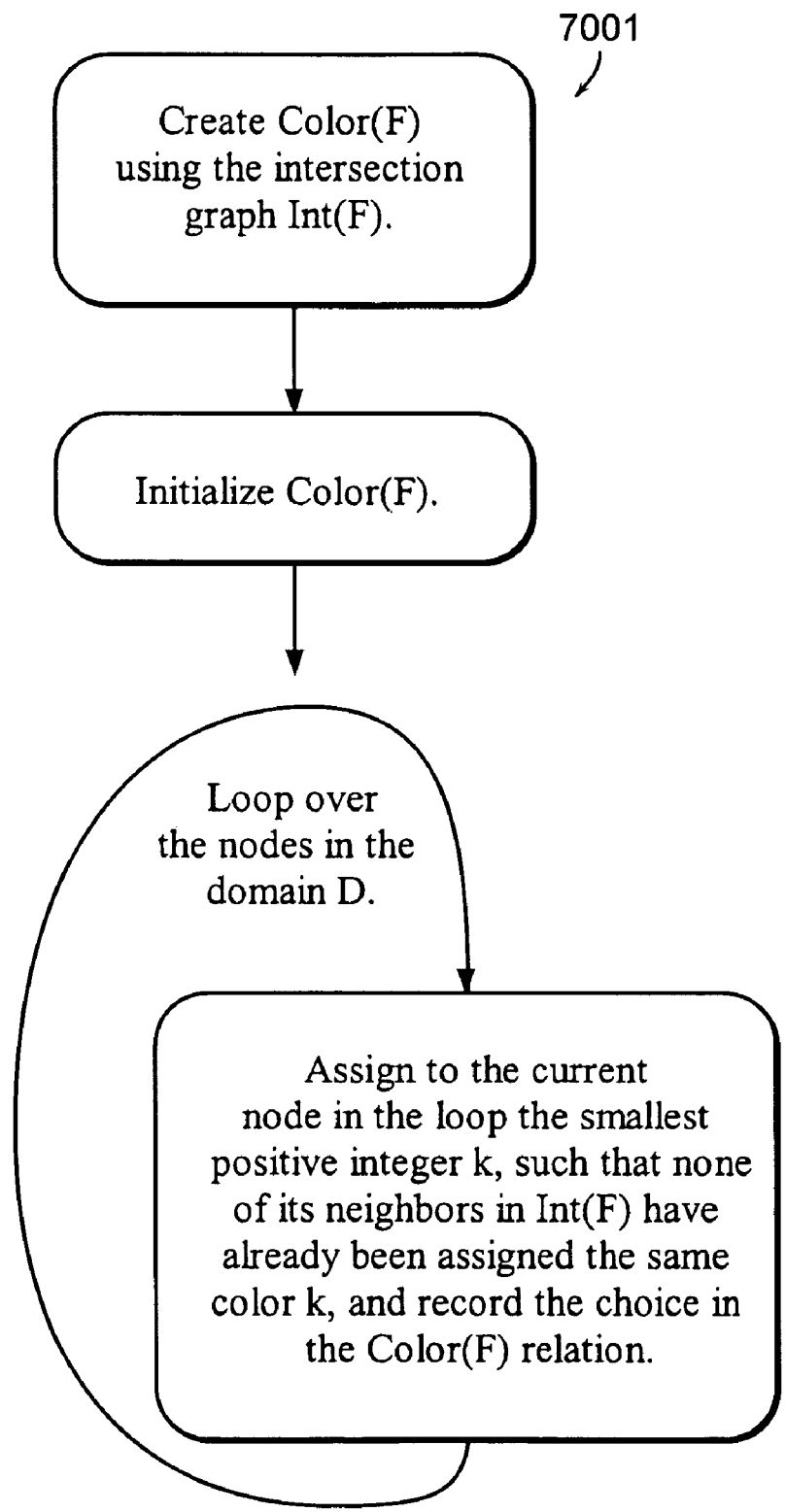
FIG. 7 is a flow diagram of a proper greedy coloring algorithm (routine) for the intersection graphs of the present invention.

The greedy proper coloring algorithm is demonstrated as routine 7001 on FIG. 7 for purposes of illustration and not limitation. There are many ways to write proper coloring algorithms for the Int(F) graph as evident by the above graph coloring references. The best algorithms will efficiently produce coloring using only close to the minimal numbers of colors for specific types of graphs, i.e., the chromatic numbers of the graphs. For the descendants-and-self function and graphs such as the Gene Ontology digraph (approximately 11,000 nodes), referenced above, the greedy algorithm 7001, above, on the other hand suffices (currently) and efficiently results in a coloring using the minimum number of colors (36 as of Fall 2002—using increasing ordering of the nodes).

The Clique(F) Relation.

It has been disclosed in the above sections how to efficiently obtain in a database system the Target(F) relation and the Color(F) relation induced by a set valued function F over a domain D. The structures revealed in the Int(F) graph and its proper coloring, Color(F), may be used to create and optimize access plans to relations referencing the domain D. One way to take advantage of the Int(F) graph and the Color(F) relation is to extract a schema, denoted here by Clique(F), that may be used to optimize querying, as defined below:

The Clique(F) relation: Start with an empty relation Clique(F) with columns to represent the nodes in the Int(F) graph: One reference column (denoted here by "node") and additional columns representing each of the colors used in the coloring relation Color(F)—(denoted here by "C1", "C2", ..., "Cn" where n is the number of colors used). Each of the nodes in the domain D is assigned a single row in the relation Clique(F) in such a way that the node itself, call it e, is mapped to the "node" column and each of the nodes d satisfying the condition: (d,e) is in Target(F) is mapped to the column representing the color of d, i.e., the color k where (d,k) is in Color(F). The remaining slots in the row may be left empty (i.e., contain the "NULL" attribute in most database systems).

Consequently, the Clique(F) relation contains rows (e,D (e,1), ..., D(e,n)) where e is from the domain D and n is the number of colors, the slot D(e,k) is empty or references a node d if (d,e) is in the relation Target(F), induced by F, and k is the color of d, i.e., (d,k) is in Color(F). A formal definition is therefore given by:

$D(e,k)=d$ if (d,e) is in Target(F) and (d,k) is in Color(F), $D(e,k)$ is empty if no such d exists.

Figure 8:
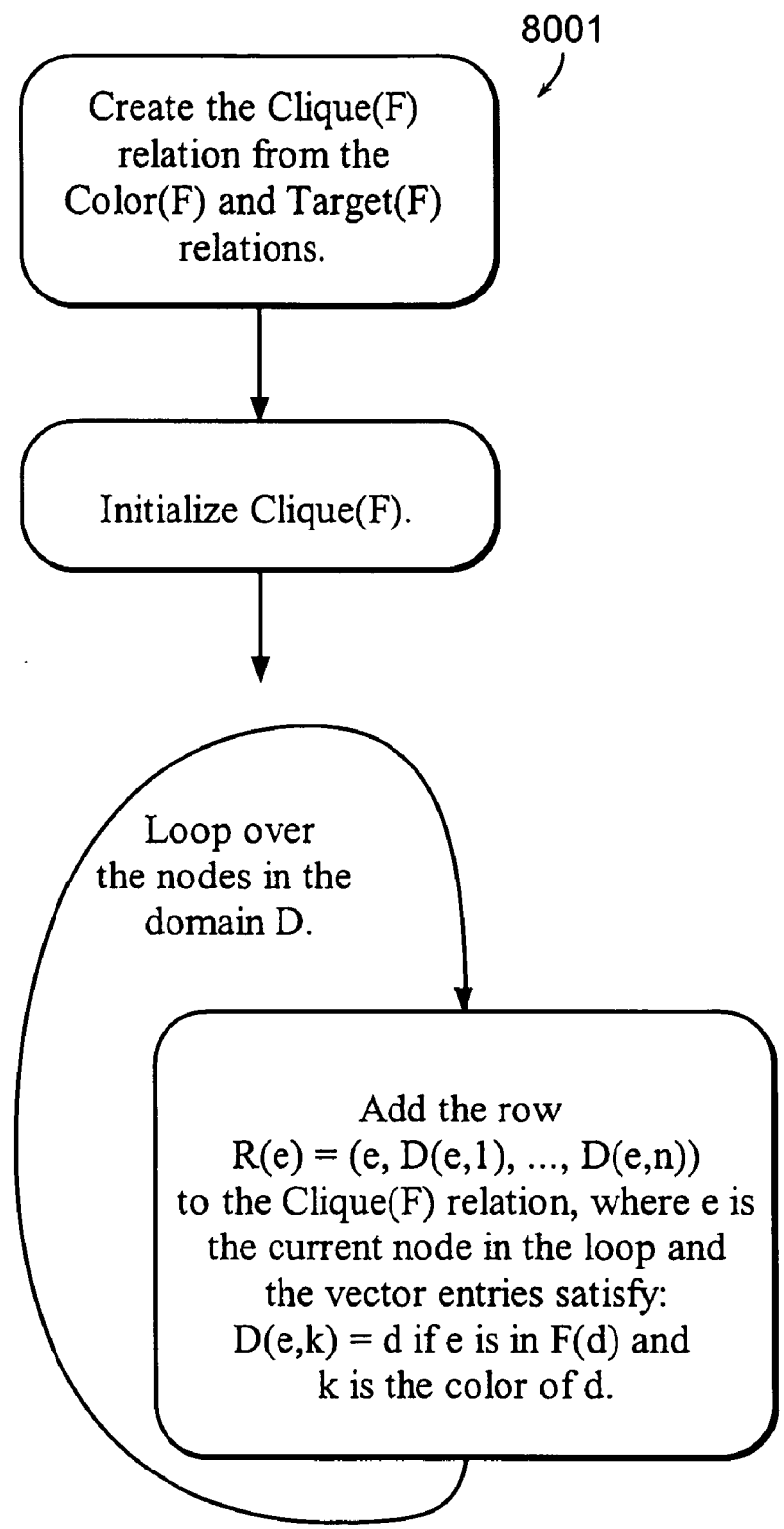
FIG. 8 is a flow diagram of a schema extraction algorithm (routine) of a preferred embodiment of the present invention.

For any fixed e, the set of nodes d satisfying: (d,e) is in Target(F), form, by definition of the Int(F) graph, a clique in the graph and therefore are all assigned different colors by any proper coloring algorithm. The algorithm for creating the Clique(F) relation is illustrated on FIG. 8 by flowchart 8001 as well as detailed above. It may be implemented efficiently in a relational or XML database system supporting minimal programming.

Figure 9:
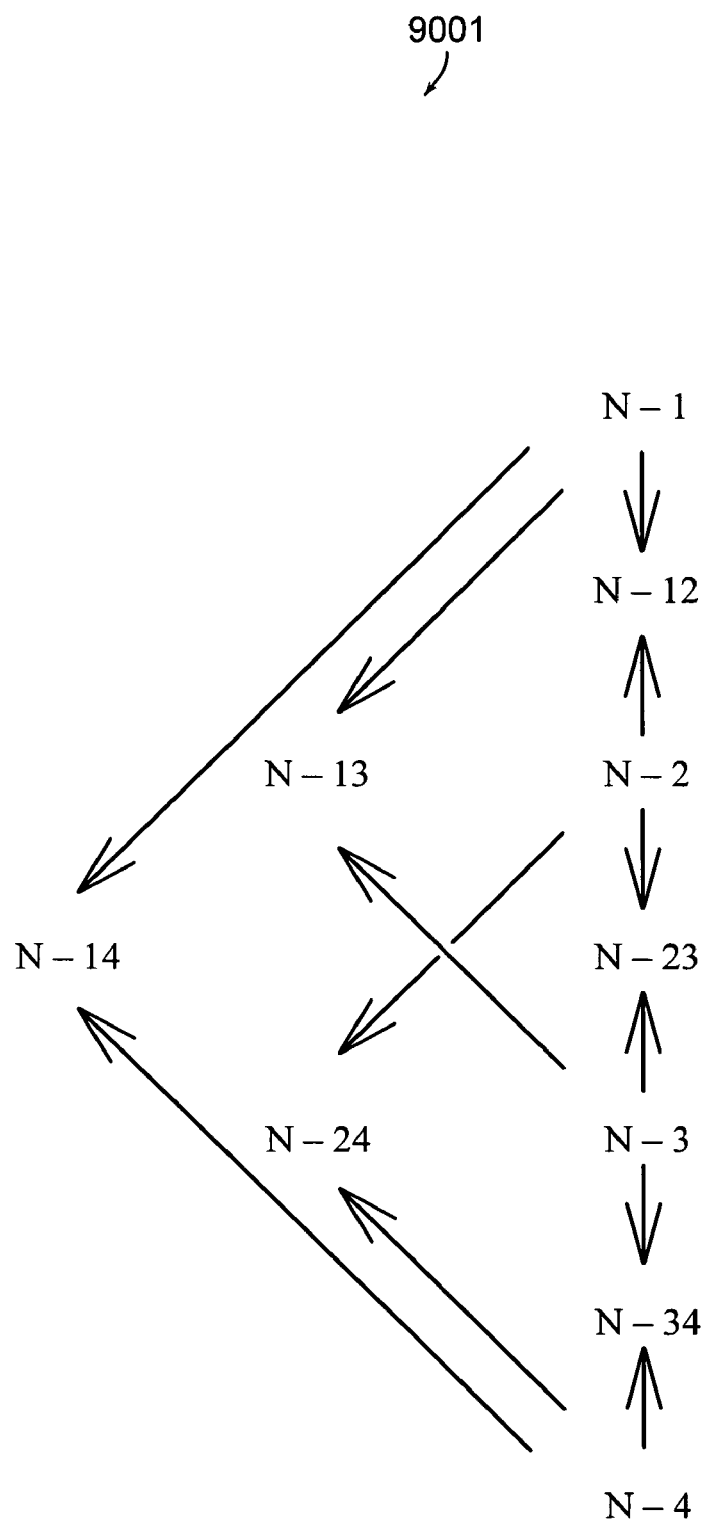
FIG. 9 shows a particular small digraph used for providing examples in the disclosure illustrating principles of the present invention.
Figure 10:
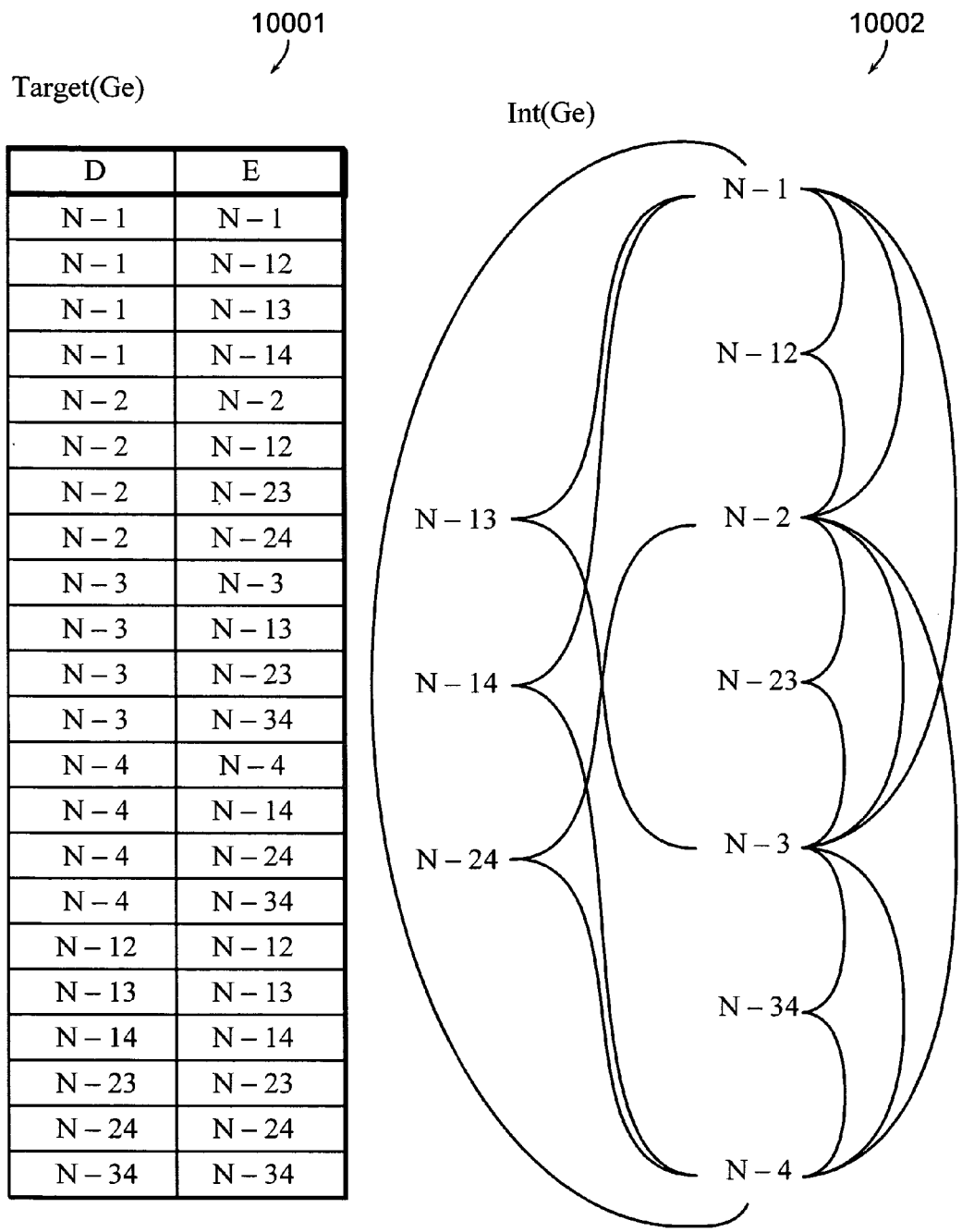
FIG. 10 shows the intersection graph and the induced target relation for the digraph of FIG. 9.

FIG. 9 shows a digraph identified by 9001. The, set valued, map descendants-and-self, derived from this digraph, is used to exemplify the above concepts. Firstly, the relation Target(Ge) induced by the descendants-and-self map is shown as 10001 on FIG. 10. Then the intersection graph Int(Ge) induced by the map is shown as 10002. The Int(Ge) graph need not be constructed in the database directly but its definition is used by the proper coloring algorithm. The result of a proper coloring algorithm (e.g. 7001) applied to the graph, 10002, is shown on FIG. 11 as relation 11001 and also identified by Color(Ge). Finally, extraction algorithm 8001 defined above is exemplified by relation 11002 and also identified by "Clique(Ge)" on FIG. 11 showing the result of the algorithm when applied to the descendants-and-self map for the particular case of the digraph 9001 shown on FIG. 9. Similarly, the results of the algorithm applied to the other set valued maps, identified previously by, Gt, Le, Lt applied to digraph 9001, are shown as "Clique(Gt)" 12001, "Clique(Le)" 12002 and "Clique (Lt)" 13001 respectively, on FIGS. 12 and 13.

The General Idea.

As explained earlier the schemas extracted, i.e., Clique (F), are used to add structure to large relations so that optimal access plans may be generated and executed in a database system. In particular the following applies: Given a set valued function F on a domain D, as above. Denote by "FactTable" a (possibly very large) relation in the database system that references the domain D in one of its columns, e.g., "node", containing entries from the domain D. A query accessing or analyzing information from the table using a set expression, to condition the query, equivalent to:

1. "f(FactTable.node, d)=1"
2. "FactTable.node IN F(d)"

where d is a node from D, is now equivalent to the following relational expression:

$$\text{"FactTable.node=Clique}(F)\text{.node and Clique}(F)\text{.Ck}=d\text{"} \qquad (3)$$

where Ck is the column representing the color (k) of d in Clique(F). When creating and executing access plans, form (3) reveals additional relational structure that may be used to evaluate the query efficiently. It enables the use of star-transformations, i.e., specific optimization methods for this equation (3) and similar settings and the use of materialized views. Form (3) also enables the use of many additional indexing techniques, including the use of bitmap and bitmap join indexing which may dramatically increase the performance of the query. See for example the documents: Oracle9i, Data Warehousing Guide, Release 2 (9.2), March 2002, Part No. A96520-01 or the Oracle9i, SQL Reference mentioned earlier for a discussion about the various access methods.

The expression "Clique(F).Ck=d" used in equation (3) may be replaced with a more complicated statement not requiring any information about the color (k) of d in Clique (F). It is, for example, equivalent to "(Clique(F).C1=d OR Clique(F).C2=d OR ... OR Clique(F).Cn=d)" where the expression is repeated for all colors from 1 to n (the number of colors used). It will in some cases, though, require more processing effort not to include information about the coloring in this way.

Figure 14:
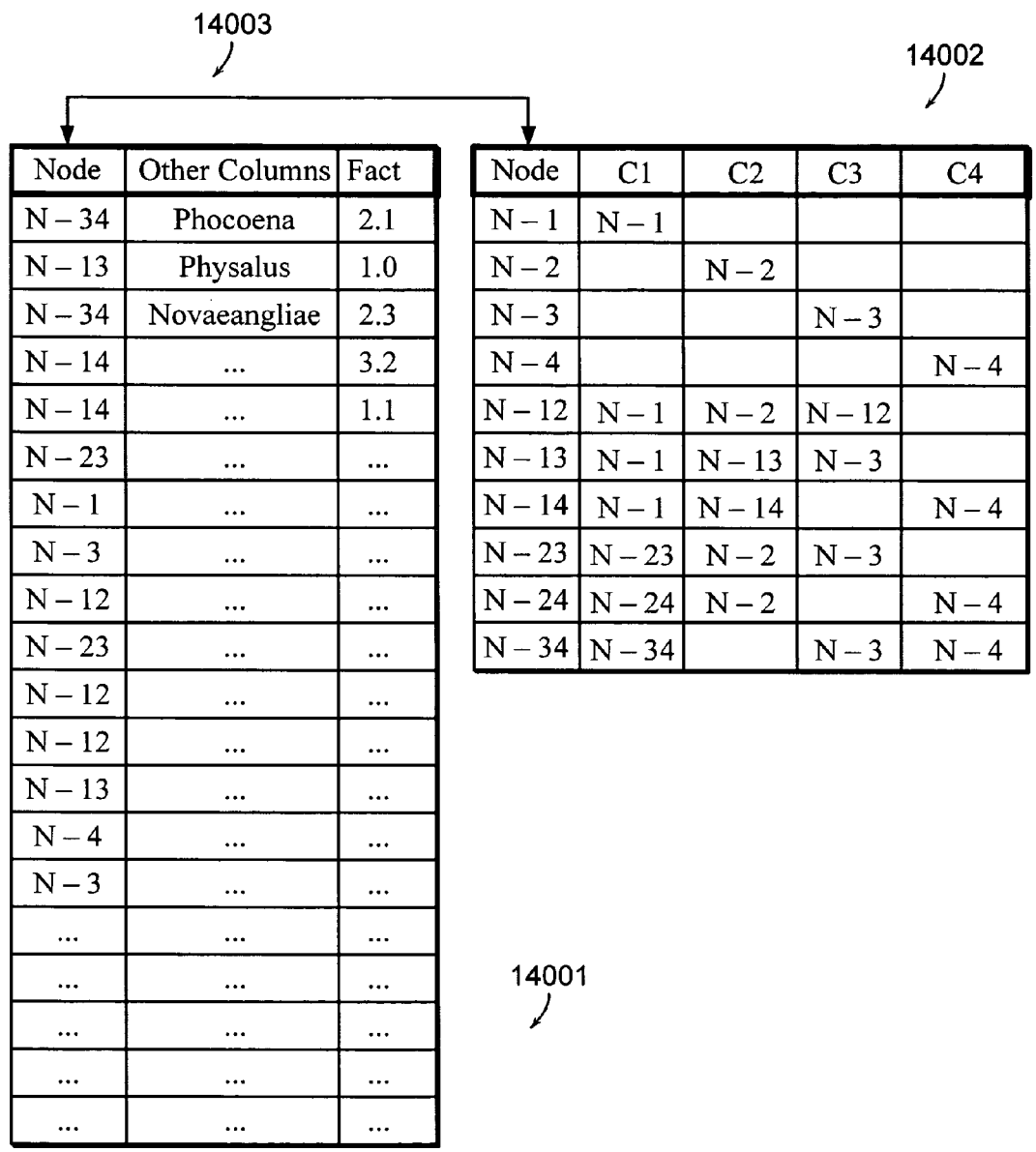
FIG. 14 exemplifies the invention join operation used to attach the extracted schema to the relation referencing the semistructured nodes in one embodiment.

The example on FIG. 14 shows a "FactTable" 14001, the table Clique(Ge) 14002 (also denoted by 11002 on FIG. 11) and an equijoin operation 14003 required to connect to the Clique(Ge) structure. In order for the database to be able to take advantage of the relationship between the tables, it may be necessary to identify the entries in the "node" column in the Clique(Ge) relation as unique. It may also be necessary to hint or otherwise inform the database system about the structure of the Clique(Ge) table.

Query Rewrite.

A system may take advantage of the schema extracted, Clique(F), and the proper coloring of the Int(F) graph by simply translating queries that reference the function or expression, F (or f, etc), into equivalent queries using Clique(F) and the coloring. As explained above the statement "f(FactTable.node, d)=1" is translated into "FactTable.node=Clique(F).node and Clique(F).Ck=d" where k is the color of the node d.

As a further explanation, a previously mentioned query, (A) select count(*) from geTermFact where Ge(acc,'GO: 0003824')=1 may be transformed into the query (B) select count(*) from geTermFact fact, Clique(Ge) clique where fact.node=clique.node and clique.C8='GO: 0003824'

Assuming that the node GO:0003824 has been assigned color 8 by the proper coloring algorithm used to create Clique(Ge). It is to be understood, as always in similar cases, that a valid database name has to be assigned to the relation identified by Clique(Ge)—in the above example Ge is the descendants-and-self map for the gene ontology digraph. In evaluating the query (B), the database system may select from several possible access plans. In some cases a bitmap join index may have been defined in the database system on the relationship between the goTermFact and the Clique(Ge) table for queries referencing column C8 and joining the node columns. This particular query may in that case be evaluated without accessing either of the tables but instead a bitmap array corresponding to the node GO:0003824 may be used instead, resulting in an efficient evaluation of the query even for the largest of tables.

Another convenient way to hide all the details and transformations from the users and systems accessing the information in the database is to use extendable or native indexing in the database taking advantage of the structures. This approach is explained below.

Extendable and Native Indexing.

Querying relations based on the entries in columns when evaluated by a function or based on position in a digraph may be effectively achieved using the structures disclosed. The process can be automated by taking advantage of extendable or native indexes inside database systems. There are several options when constructing the index methods. Firstly, the index constructed may return lists of:

1. Logical or physical locations of the rows satisfying the query, i.e., "rowids".
2. Bitmap arrays (in various compressed forms) representing the rows in the relations satisfying the query.

Secondly, the input for the index-create method may require a digraph, a function or a conditional expression to construct the index over a table column. Some of the options facing the index designer include:

1. Requiring the user to specify a digraph and table column (s) to be indexed, e.g., using Oracle's 9.2i syntax: create index <Index name> on <Fact table>(<Column(s)>) indextype is <Type name> parameters('<Graph table>').
2. Requiring the user to specify a domain/digraph and a function name or a logical conditional expression and table column(s) to be indexed, e.g., create index <Index name> on <Fact table>(<Column(s)>) indextype is <Type name> parameters('<Function/Expression, Domain table>').
3. Requiring the user to specify only a table column and a function name or expression, e.g., create index <Index name> on <Fact table>(<Column(s)>) indextype is <Type name> parameters('<Function/Expression>').

In the first two cases, the techniques required to create the additional structures: the Clique and the Color relation, have been disclosed. The third format requires the domain D to be defined as the (distinct) values coming from the table column(s) and requires the Clique and Color relation to be maintained dynamically. This is discussed in the section on variable domains below.

The use of additional database structures such as bitmap join indexes has also been disclosed. The index-create method may therefore set up, the schemas extracted from the semistructured data, the Clique and Color relation as well as to establish additional indexing both on the tables individually and by using the join condition between the table column(s) and the Clique table. This may include bitmap join indexes. One of the current implementations of the system in an Oracle database, for example, creates 36 bitmap join indexes (since there are 36 colors required for proper coloring of Int(Ge) in this case) when indexing a column referencing the gene ontology digraph. Queries using the function take full advantage of these bitmap join indexes through the use of extendable indexing in Oracle.

When queries are issued that are conditioned by a function/operator and a column that has been indexed by the extendable indexing or by native indexing technologies, the system may rely on the indexing to provide the resulting rowids or bitmaps. It is then the responsibility of the indexing technology to use the proper coloring and the Clique tables to construct a query taking advantage of the additional structures extracted and additional indexing set in place, and maintained by the indexing methodology. The methodology created to maintain indexes and examples are disclosed in the Oracle document: Oracle9i, Data Cartridge Developer's Guide.

Variable Domains.

The domain, D, used to denote the input for the set valued function is in many cases not known beforehand or is deemed too large. It may for example just be the set of all numbers available in a database system. In this case, the domain may be derived dynamically and updated from the table being indexed directly so that it contains only a small subset of all possible values. The domain D is in this case referred to as being variable. Since the set valued function F is now defined on a domain which is allowed to change, the definition of the function may be required to be deterministic in nature, i.e., the value f(e,d) does not depend on the other elements in the domain, only on the input values "e" and "d". The induced relation, Target(F) and the structures Clique(F) and Color(F) may be maintained dynamically as the domain varies. The two operations that need to be implemented are:

1. Adding a new element to D.
2. Removing an existing element from D.

Figure 15:
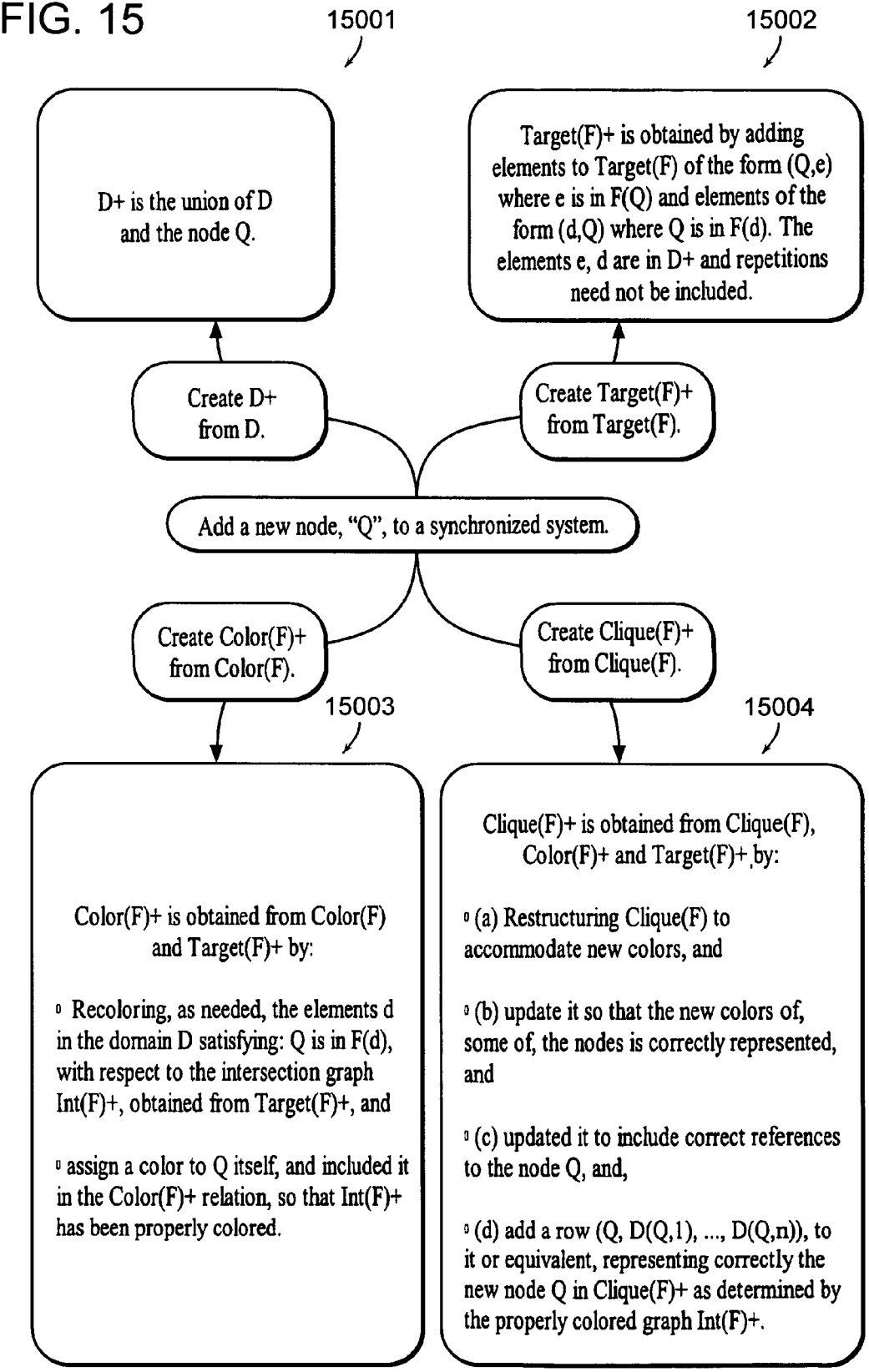
FIG. 15 and FIG. 16 are flow diagrams of the routines (algorithms) used in a preferred embodiment to dynamically maintain the schemas extracted.

In the preferred embodiment, the incremental algorithms required in each operation are as follows with reference to FIG. 15, many variations are possible though:

Adding a new element to D: The algorithms required to modify Target(F), Color(F) and Clique(F) to accommodate a new element, say Q, are explained below. It is assumed that the relations D, Target(F), Color(F) and Clique(F) are all synchronized (in a consistent state with respect to the domain D and the set valued function F). After the new node, Q, has been added to the domain and all the relations have been updated the corresponding synchronized relations are denoted by D+, Target(F)+, Color(F)+ and Clique(F)+. Additionally, the intersection graph induced by D+ and Target(F)+ is referred to as Int(F)+, as before it need not be explicitly realized in the database. As always, there are many possible equivalent variations of the processes defined:

1. The domain D+ is obtained by adding the element Q to D (see step 15001 in FIG. 15).

2. The relation Target(F)+ is obtained by adding to Target(F) all new entries of the form (Q,e) where e is in F(Q) and all new entries of the form (d,Q) where Q is in F(d), e.g, using SQL the Target(F)+ relation is:
Target(F) UNION
(select d.d as d, Q as e from D d where f(Q,d.d)=1) UNION
(select Q as d, e.e as e from D+ e where f(e.e,Q)=1)
This is illustrated in step 15002 in FIG. 15.
3. The relation Color(F)+ is obtained by recoloring, as needed, the elements d in the domain D satisfying: Q is in F(d), with respect to the intersection graph obtained from Target(F)+. Additionally, Q itself needs to be assigned a color and included in the Color(F)+ relation (see step 15003 in FIG. 15).

The recoloring may be achieved as follows: Start by determining a relation mapping the old color of some of the nodes to new colors. This may involve the following steps:
  a. Evaluating Old-To-New as the relation, initially:
     select d.d as d, col.c as old, 0 as new from D d, Color(F) col where f(Q,d.d)=1 and col.d=d.d
     It references all the nodes (except possibly Q itself) that are required to construct the row in Clique(F)+ corresponding to Q. Therefore all these nodes need to be assigned different colors, if that is not the case already.
  b. Determine which nodes in Old-To-New should be recolored. It is not necessary to recolor all the nodes, if any. One may remove at least as many respective nodes (rows), in the Old-To-New relation, as there are distinct colors used in the Old-To-New relation initially: To achieve this elimination, one may, for example, order the Old-To-New relation according to (old) color and the first time a color is observed when traversing the list the corresponding node is just assigned its old color. Other possible methods include using, additionally, attributes relating to the intersection graph to choose which nodes should not be recolored.
  c. The recoloring of the remaining nodes in Old-To-New and of Q itself may proceed in a greedy fashion using the Target(F)+ relation to assign proper colors to the induced Int(F)+ graph. This may be achieved by first removing the color from the nodes to be recolored (e.g., by removing their corresponding entry from Color(F)) and then looping through the nodes to be recolored (including Q) and assign a color to each of the nodes that has not already been assigned to any of its neighbors. The new choices may be added or registered in the Color(F) relation during the process. Proper coloring is explained in details in connection with the algorithm (invention routine) shown on FIG. 7. After the processes is completed the Color(F) relation has been transformed into the desired Color(F)+ relation. It is also, at least for the disclosure, convenient to register the choices of color in the Old-To-New relation so that the "new" column references the new color selected for the associated node. This information is required when the Clique(F) relation is converted into the Clique(F)+ relation (which may be coupled with the above process).
4. Clique(F)+ is obtained from Clique(F) as follows and illustrated at 15004 in FIG. 15.
  a. Clique(F)+ needs to be able to accommodate new colors. It may therefore be necessary to add columns to the Clique(F) table if it does not already contain columns representing all the colors in Color(F)+.
  b. The previous recoloring of some of the nodes must be reflected in Clique(F)+. There are several possible ways to achieve this updating of Clique(F). One can, for example, use the two step process:
    (Step 1) Remove references to the old colors. This may be done by looping over the recolored nodes in the Old-To-New relation, defined above, and issue an SQL update statement, for each recolored node d, similar to: "update Clique(F) set C(old)=NULL where C(old)=d". Here d is a recolored node and C(old) refers to the column in Clique(F) representing the color of d before recoloring. Additionally, a temporary reference pointing to the updated rows in Clique(F) may be maintained for further processing. This may be done, for example, by having the SQL update statement, shown above, return references to the effected rows, i.e., rowid(s). The set of references is denoted here by R(d) and is created for all the recolored nodes d. It may be stored in a relation relating a recolored node d with the rowids of the corresponding updated rows.
    (Step 2) Register the new colors in Clique(F). This may be done by looping, again, over the recolored nodes in the Old-To-New relation and issue for each recolored node d an update statement equivalent to: "update Clique(F) set C(new)=d where rowid IN (R(d))". As before d is a recolored node but C(new) refers to the column in Clique(F) representing the new color of d after recoloring.
    The two step process, above, just moves the recolored nodes from one column to another row-wise.
  c. The node Q should be represented correctly in Clique (F)+. This may be done by a simple update statement, equivalent to:
    update Clique(F) set C(k)=Q where
      node IN (select e from Target(F)+ where d=Q)
    here C(k) is the column representing the color of the new node Q.
  d. A row, or equivalent, representing the node being added, Q, needs to be added to Clique(F). The row is defined, similarly as before, by:
    (Q, D(Q,1), . . . , D(Q,n))
      where n is the number of colors in Color(F)+ and D(Q,k)=d if (d, Q) is in Target(F)+ and (d,k) is in Color(F)+, D(Q,k) is empty if no such d exists, as explained earlier.

The modified relation Clique(F) is denoted by Clique(F)+ and it is now synchronized with the other relations D+, Target(F)+ and Color(F)+ as required.

Of course, the relations need not be represented in a database system. One may quite as well build and maintain the objects using almost any computer language and system. The algorithms outlined above in items 1, 2, 3 and 4 are summarized on FIG. 15 as 15001, 15002, 15003 and 15004, respectively.

Figure 16:
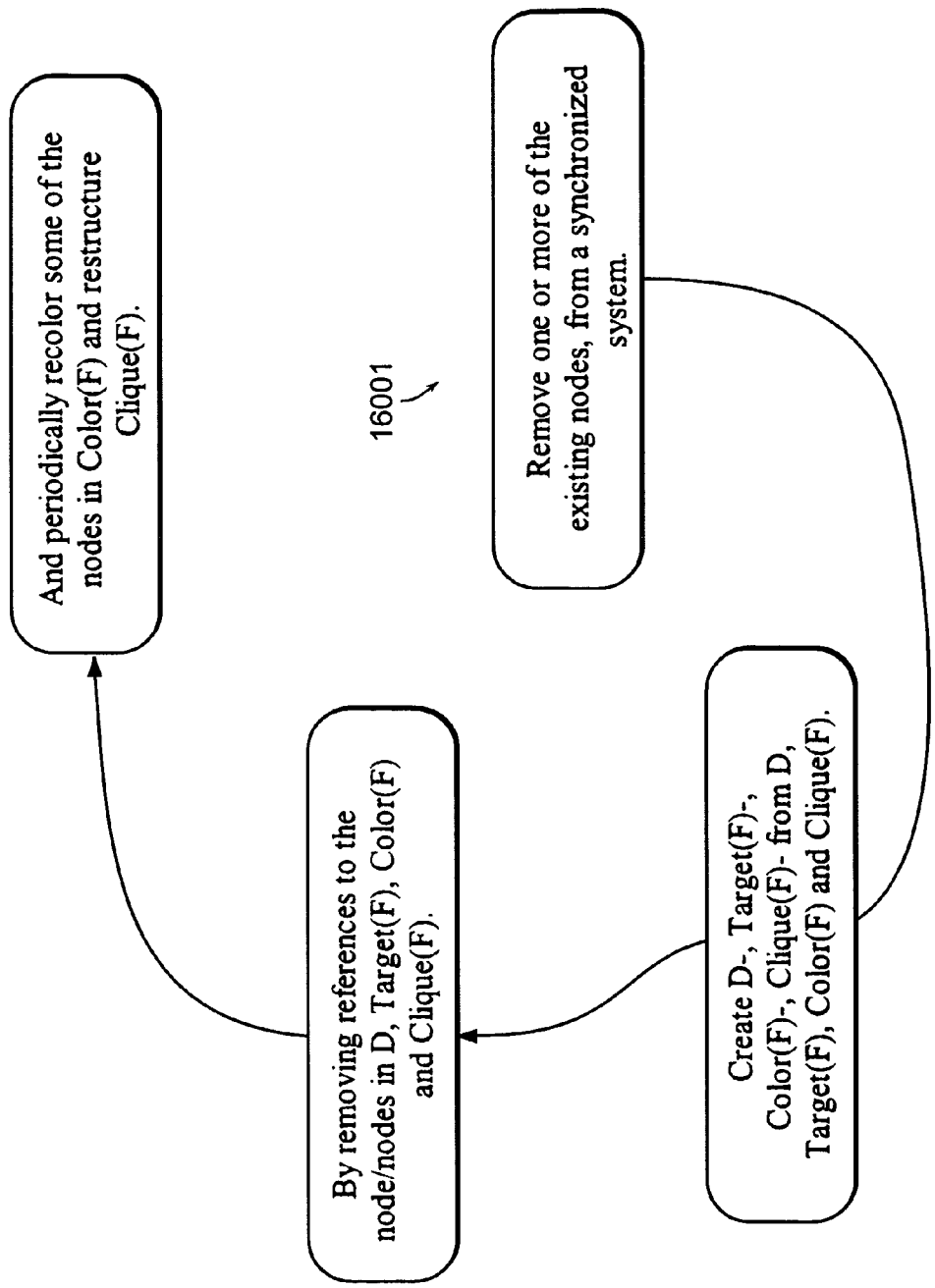

Removing an existing element from D: The algorithms required to modify Target(F), Color(F) and Clique(F), when an element is removed from D are explained below with reference to FIG. 16. Again, it is assumed that the relations D, Target(F), Color(F) and Clique(F) are all synchronized before the process starts. After the node has been removed the corresponding synchronized relations are denoted by D−, Target(F)−, Color(F)− and Clique(F)−. The element to be removed from the domain will be denoted by the letter P. There are many possible equivalent variations of the processes outlined.

1. The domain D− is obtained from D by removing the element P from D.
2. The relation Target(F)− is obtained from Target(F) by removing all entries which reference the element P, i.e., entries of the from (x, P) and (P, y).

These two steps are efficiently implemented in SQL using simple "DELETE" statements. They may also be deferred without affecting the logic of the system.

3. The Clique(F)− relation is obtained from Clique(F) by performing two steps:
   a. The column representing the color of P is updated so that all occurrences of P are replaced with a NULL value in the column—this operation may also be deferred in some cases since additional values with no color (such as NULL) or not referenced in the table joined to Clique(F) need not affect the logic of the system.
   b. The row (P, D(P,1), . . . , D(P,n)), defined earlier, in Clique(F) representing the P node is removed. Again this step may also be deferred without affecting the logic of the system.
4. The Color(F)− relation is obtained from Color(F) by removing the entry representing the node P from Color (F).

As indicated it is not necessary to perform the above steps 1 to 4 every time a node is removed. A bulk removal is acceptable in most cases. Periodically, a recoloring or partial recoloring and cleanup, may be applied to make the Clique (F) table more compact after one or several nodes have been removed. The processes described in steps 1 to 4 above are summarized on FIG. 16 as process 16001.

The above disclosed algorithms are used for dynamically maintaining the extracted schema structures as explained. They may therefore be used to dynamically maintain indexes that efficiently facilitate complex grouping of values in a column. Such an index may be understood to be a set-valued-function/multivariable-expression index or simply a grouping index. Each value x on the domain defines a group of values, i.e., F(x). This is further demonstrated in the examples below.

Variations.

There are many equivalent ways to implement the methods disclosed as is apparent to the person skilled in the art. In some cases, system limitations require alternative implementations. One such limitation in relational database systems is the maximum number of columns that may be used in a table, e.g., approximately 1000 in Oracle 9i. In cases when the number of colors needed to properly color the induced Int(F) graph exceeds this number, the Clique(F) table may broken into several tables each representing only a subset of the colors, i.e., using vertical fragmentation.

It is also possible to keep some of the performance enhancements associated with using the extracted Clique(F) schema without using any proper coloring at all, thereby obtaining a more compact structure. An example of such a design is shown as 13002 in FIG. 13 and labeled "Ge—Multicolor". Each row in the table contains the same nodes as shown in table 11002 on FIG. 11, but columns in 13002 do not represent colors of nodes and the same node is assigned to more than one column in some cases. This structure, i.e., 13002, can also be joined with a table referencing graph 9001 on FIG. 9, and queries utilizing the Ge operator may be efficiently translated to queries about the joined tables. The multicolor setup, just described, also applies in general to the algorithms disclosed in the application.

The Target(F) relation, or equivalent structures, can additionally be used directly to build set-valued-functional indexes on a relation referencing semistructured data as follows. For each node d in the domain D, the extracted Target(F) table is used to build, on demand or permanently, bitmap arrays pointing to all rows in the relation containing nodes from F(d). This may be achieved by using the database system to build bitmap indexes on the referencing column(s) in the relation directly and then use the logical OR operator to generate bitmap arrays that represent rows with elements from the set F(d). In other words, by applying the logical OR operator to all the bitmap arrays pointing to rows in the relation containing individual nodes from F(d), e.g., using Target(F) to obtain such a list of nodes. The resulting composed bitmap arrays may be maintained and used by the database system as part of a set-valued-functional index definition.

Additional Usage Examples.
1. Grouping index: As an example the disclosed algorithms can be used to create an index on a number column in a table. Given a table, named Observations, with a number column x and a set valued function F realized as "f(y,x)=1 only if ln (y)*x>cos (x)+y" (any expression will do here). In other words, y is in F(x) if and only if ln (y)*x>cos (x)+y. The index may be constructed so that the statement to build the index is as follows:
   create index Inequality on Observations(x)
      indextype is BooleanSetExpression
      parameters('y is in F(x) iff: ln (y)* x>cos (x)+y')
   The conditional statement used "ln (y)*x>cos (x)+y" is a Boolean statement that may be used to populate Target(F) as described earlier and therefore generate and maintain Clique (F). The first part "y is in F(x) iff:" is used to determine what are the variables used in the description. No digraph is required and the index may be maintained dynamically using the algorithms disclosed earlier. Using the index is simple, e.g., using current Oracle 9.2i indexing methodology, the index-type is associated with a function f(y,x) so that a query such as:
   with D as (select distinct x from Observations)
   select max(sum(f.x))
      from Observations f, D
         where f(f.x, D.x)=1 group by D.x
   may use the extracted schema, i.e., Clique(F), and additional structures, to efficiently evaluate the statement, equivalent to:
   with D as (select distinct x from Observations)
   select max(sum(f.x))
      from Observations f, D
         where ln (f.x)*D.x>cos (D.x)+f.x group by D.x
   The usefulness of the index is particularly clear when the ratio between the number of rows in the Observations table and the distinct values (domain D) on the x column is high. Instead of using the complicated formula above, the indexing joins the Clique(F) table with the Observations table (f above) so that the database system can take advantage of the equivalence between:
   "ln (f.x)*D.x>cos (D.x)+f.x" (for a fixed D.x) and the expression,
   "f.x=Clique(F).node and Clique(F).C(k)=D.x"
      where C(k) is the column representing the color (k) of the node D.x. This has already been explained carefully above.
2. Compound spatial index: A table "Accidents" has location columns, the coordinates in some (x, y) grid, and the table also has a "cost" column as well as possibly other information and measures. A (compound) spatial index on this table may be created and maintained using the above algorithms (routines) of the present invention. The index create statement may be formed as follows:

create index Neighborhood on Accidents(x,y)
    indextype is BooleanSetExpression
    parameters('(a, b) is in F(x,y) iff: sqrt((x−a)*(x−a)+(y−b)*(y−b))<10')

Similarly to the previous example the expression "sqrt((x−a)*(x−a)+(y−b)*(y−b))<10" may be used to build Target (F) and consequently therefore also Clique(F). In many cases a filtering hint submitted will increase the efficiency of inserts into the table, i.e., the maintenance of Target(F), in this case the pre-filtering may be submitted by replacing the formula "sqrt((x−a)*(x−a)+(y−b)*(y−b))<10" with the equivalent formula: "a<x+10 and a>x−10 and b<y+10 and b>y−10 and sqrt((x−a)*(x−a)+(y−b)*(y−b))<10". This is accomplished using the index create expression:

create index Neighborhood on Accidents(x,y)
    indextype is BooleanSetExpression
    parameters('(a, b) is in F(x,y) iff: a<x+10 and a>x−10 and b<y+10 and b>y−10 and sqrt((x−a)*(x−a)+(y−b)*(y−b))<10')

Depending on how clever the database system is, the filtering hints may be expanded further, e.g., "a<x+10" may be replace with "a<x+10" and "x>a−10" and so on.

The index may now be used to evaluate efficiently queries, relating to accidents and neighborhoods, through an index-type binding with some operator f, such as:

with D as (select distinct x, y from Accidents)
select max(sum(a.cost))
    from Accidents a, D
        where f(a.x, a.y, D.x, D.y)=1 group by D.x, D.y
the query is equivalent to
with D as (select distinct x, y from Accidents)
select max(sum(a.cost))
    from Accidents a, D
        where sqrt((D.x−a.x)*(D.x−a.x)+(D.y−a.y)*(D.y−a.y)) <10
    group by D.x, D.y and so on. The first form, using the index, i.e., Clique(F), does not require evaluating the inequality, instead the Clique (F) table is joined with the Accidents table and the color of location nodes, and the nodes themselves (x,y), are used to determine the rows in the Accident table that satisfy the inequalities. The join process may be further enhanced by taking advantage of additional structures on the Accidents and Clique(F) relations. In particular, for a large Accidents table, bitmap indexes on the Accidents table or bitmap join indexes on the joined tables can be used.

Figure 17:
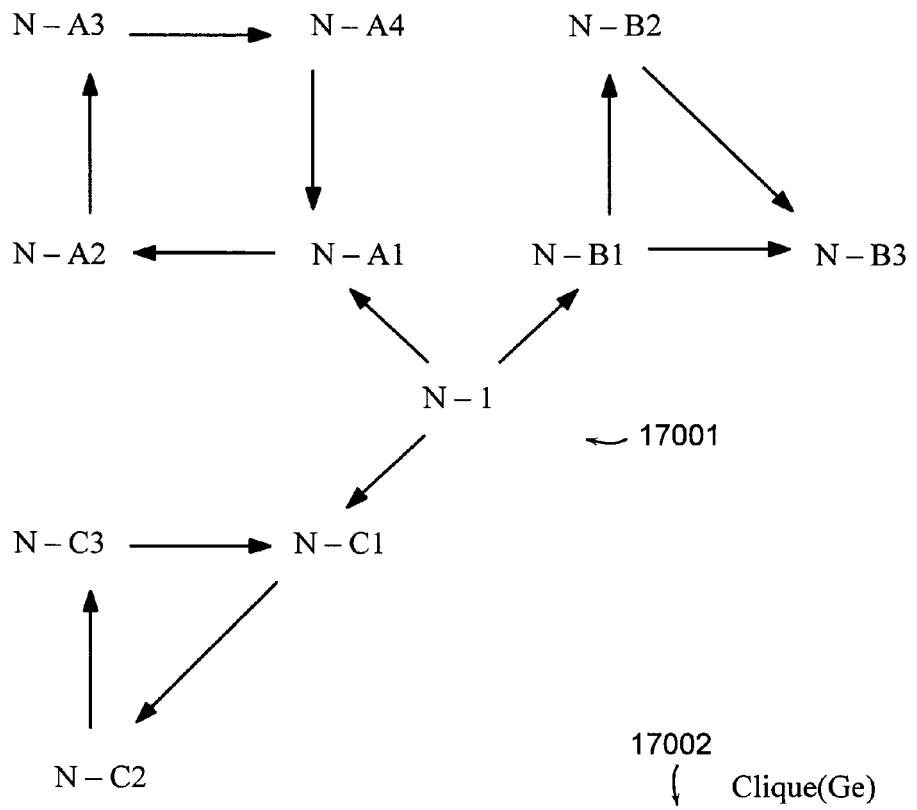
FIG. 17 illustrates a particular cyclic digraph.

3. Cyclic Digraphs: The algorithms disclosed for digraphs are written so as to accommodate cyclic graphs without entering into endless loops. FIG. 17 shows a digraph, 17001, with cycles. The digraph may be represented in a database as a binary relation, e.g, named "cycles". A large table with a node column with entries from the digraph is called Measurements. The index create statement for the descendants-and-self function for efficient searches in the Measurements table may be entered as follows:

create index IX on Measurements(node)
    indextype is digraphGeBitmapJoin parameters ('cycles')

The index create statement, when executed, colors the induced intersection graph and builds the extracted Clique (Ge) relation shown as 17002 on FIG. 17. The Target(Ge) relation used in the process is efficiently built using the digraph as disclosed above and the coloring of Int(Ge) proceeds in a greedy fashion as previously disclosed. The Int(Ge) graph requires 5 colors represented by columns C1, C2, C3, C4 and C5 in table Clique(Ge). The index create statement also adds bitmap join indexes on the color columns based on the equijoin between the node columns of Clique(F) and the Measurements table. This may be done using the bitmap join index create statement of the relational database system. Queries using the Ge operator are then made to take advantage of the bitmap join indexes by the indexing schema created. The rowids of the Measurements table satisfying a query such as:

select * from Measurements where Ge(node,'N−A3')=1 are retrieved by the indexing start and fetch mechanism by issuing a statement equivalent to:

select f.rowid from Clique(Ge) d, Measurements f where f.node=d.node and d.C4='N−A3' since the color of the 'N−A3' node is represented by the C4 column in Clique(F) according to 17002 from FIG. 17. In some cases it may be necessary to explicitly instruct the database system to select an access plan using the bitmap join indexes, if available. Using the Oracle 9.2i database such a hint may be planted by using +INDEX_COMBINE(f) in the above select statement so that the SQL statement issued is equivalent to:

select/*+INDEX_COMBINE(f)*/f.rowid from Clique (Ge) d, Measurements f where f.node=d.node and d.C4='N−A3'

The index may also be instructed to select other access plans, such as other star transformations not involving the use of bitmap join indexes. Both a regular bitmap index and a bTree index on the node column in the Measurements table can be utilized. The Clique(Ge) relation is small and the mapping from the color columns to the node column in Clique(Ge) is most efficiently handled using in-memory operations, and in-memory derived structures, when an access plan requires such a mapping. Correctly set cost parameters will allow the database to select the most efficient access plan automatically based on available additional indexes.

4. Gene Ontology: The gene ontology digraph is a directed acyclic graph. As of fall 2002 the gene ontology digraph contains approximately 11,000 nodes. As part of the exploration of the human genome, extensive data is collected and referenced using the gene ontology digraph. Access to the data may be efficiently planned using the algorithms disclosed. For example, if the digraph is realized in a database system using a binary relation called "go" and a table called goTermFact has a column, "acc", referencing the digraph, then an index, optimizing queries using the Ge operators of the present invention, may be created using the following syntax:

create index goIX on goTermFact(acc)
    indextype is digraphGeBitmapJoin parameters('go')

Similarly, indexes may be built to optimize access with respect to any of the other set valued digraph functions such as Gt, Le and Lt disclosed above. The number of colors needed to properly color the induced Int(Ge) graph is currently 36. The independence between the number of colors and the number of nodes in the graph makes the Clique(Ge) relation practical in facilitating efficient access to large datasets referencing the digraph.

5. Other digraphs in life sciences and medicine: Many other digraphs in life sciences and medicine are efficiently used to index datasets using the algorithms disclosed. This includes schemas such as the Systematized Nomenclature of Medicine or SNOMED (www.snomed.org), naming schemas created/adopted by The Interoperable Informatics Infrastructure Consortium or I3C (www.i3c.org) and by other organizations.

6. Path expressions: As has been disclosed, set valued maps may be defined using path expressions. The structure extracted relative to such set valued functions may therefore be used to optimize the evaluation of queries referencing the semistructured data specified by the path expressions. The required steps involved in the optimization process may be hidden from the user by implementing a path expression indexing system. Below, bitmap indexing is exemplified for path expressions. The index may be created using the following create statement:

create index mtDNA_Inheritance on mtDNA_Study(id) indextype is
Path_Expression parameters('F(d) is: d:.mother*, e is in F(d) iff:
EXISTS(e:.mother.mother*.d:), Genealogy')

In the above, the column "id" of the mtDNA_Study table references the Genealogy digraph. In this case there are two path expressions that are submitted as parameters to the indexing system. Each of the expressions submitted "d:.mother*" and "EXISTS(e:.mother.mother*.d:)" results in a separate Clique(F) structure, denoted here by Clique-1 and Clique-2, respectively. The index type may be bound to an operator f so that the queries:

(A) select s.region from mtDNA_Study s, Group g where f(s.id, g.id:.mother*)=1,
(B) select s.region from mtDNA_Study s, Group g where f(s.id, EXISTS(g.id:.mother.mother*.s.id:))=1 are evaluated by using bitmap join indexes on Clique-1 and Clique-2, respectively. Selecting between Clique-1 and Clique-2 is done using simple pattern matching. Additionally, the indexing system may create a bitmap index on the "id" column in the mtDNA_Study table so that a query such as:

(C) select s.region from mtDNA_Study s, Group g where f(s.id, g.id:._*)=1 may be evaluated by dynamically combining bitmap arrays created for nodes from the "id" column into a bitmap for the expression. More specifically, a Clique(F) table has not been extracted for the set expression "d:._*" since it was not specified in the index create statement. Therefore a dynamic bitmap is created by using the logical OR operator on the collection of bitmap arrays defined over the "id" column and associated with the nodes resulting from evaluating the expression "g.id:._*" directly. If no predefined expressions are submitted as parameters, in the index create statement then the indexing system uses only dynamic bitmap creation to submit row references back to the database system.

It will be clear to a person skilled in the art that the methods disclosed in the example and in the above may be used to create a bitmap indexing system for path expressions.

CONCLUSION

Figure 18:
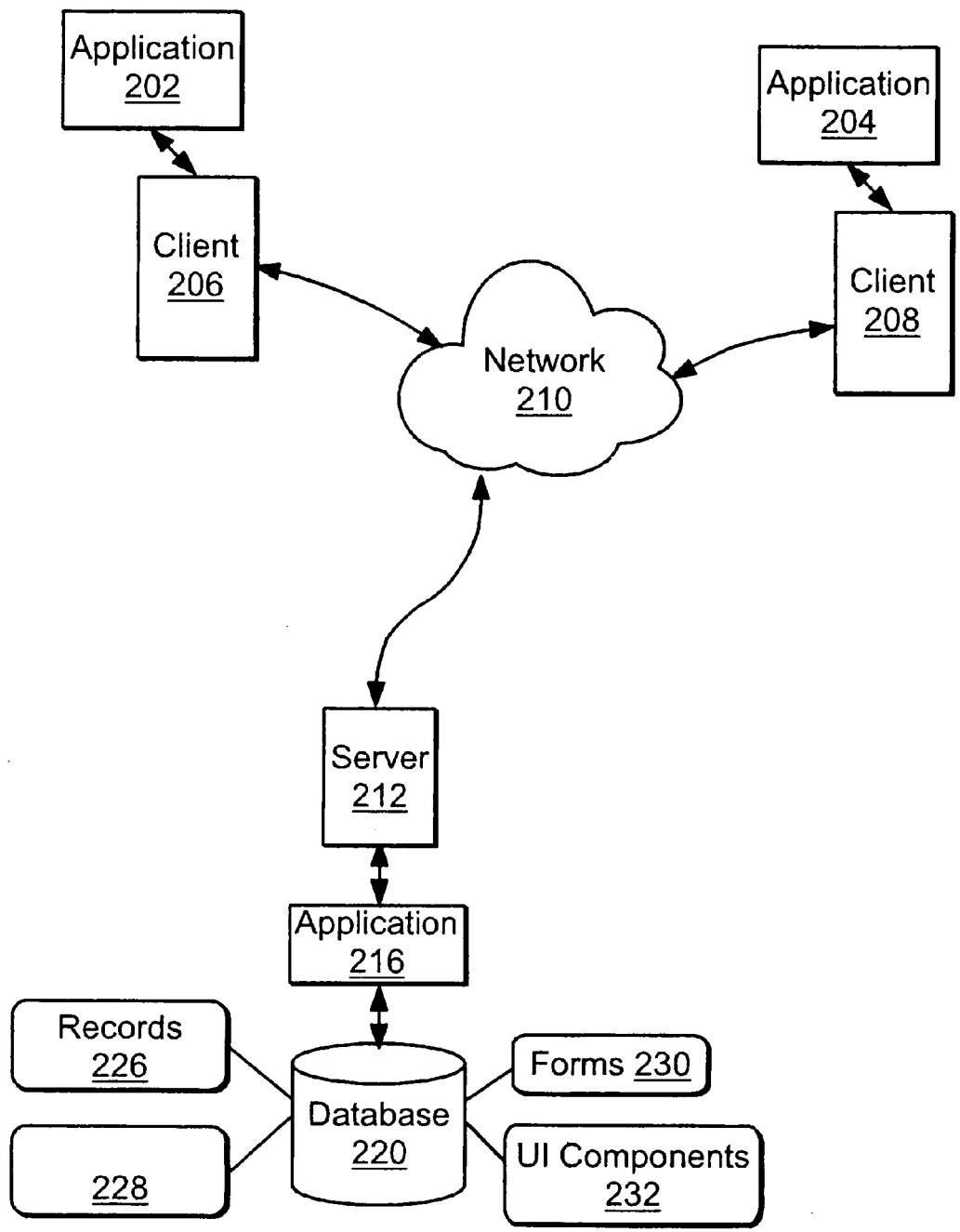
FIG. 18 is a block diagram of a computer system environment in which the present invention is practiced.

The invention may be implemented as any suitable combination of hardware and software. FIG. 18 is a diagram of a computer architecture for implementing embodiments of the present invention. An application 202, 204 running on client computers 206, 208 is connected to a communications network 210. The application 202, 204 can be a Web Browser (e.g., Netscape Navigator or Microsoft Internet Explorer) or a proprietary client. The communications network 210 can be a proprietary network (e.g., Local area network, wide area network, etc.), a public network (e.g., Internet) or some combination of both. The communications network 210 connects client computers 206, 208 to server computer 212. Server application programs 216, run on the server 212 and provide access to data stored in connected database 220. Application programs 216 may be server software or other Internet server software or the like.

A database 220 contains records 226, forms 230, and UI components 232. Database records 226 store data in fields. Forms 230 define the layout, either storage or presentation, of data stored in the database 220. UI components 232 are stored with the database 220 and provide various controls for interacting with the database records 226. The present invention method and/or apparatus may be implemented at 228 as part of the database system 220 or at the application level 216, for example.

Although client applications (202, 204) shown in FIG. 18 are connected through a network 210, they also may be locally connected directly to database 220, 222, so that network 210 is not required.

While particular embodiments have been described, various other modifications will be apparent to those skilled in the art.

While this invention has been particularly shown and described with references to preferred embodiments thereof, it will be understood by those skilled in the art that various changes in form and details may be made therein without departing from the scope of the invention encompassed by the appended claims.

What is claimed is:

1. A computer implemented method for querying semistructured data, comprising:

in a computer processor:
extracting schema information of semistructured data in a database system; and
receiving a given set valued function which references the semistructured data;
using the given set valued function, said extracted schema structure information and a coloring routine, building a dimension table wherein a query on a relation with the semistructured data, the query being conditioned on said set valued function, is evaluated using said built dimension table joined with the relation, instead of being evaluated using said set valued function, and the dimension table effectively serving as an index into the relation.

2. The method of claim 1, wherein the relation is represented by a fact table; and
said dimension table provides said database system with pointers for a node in said semistructured data, the pointers being to all rows, in said fact table, containing nodes from an output set of said set valued function when applied to said node.

3. The method of claim 2, wherein said pointers are implemented using logical bitmaps or are implemented using bitmap join indexes between the fact table and corresponding dimension table.

4. The method of claim 3, wherein said semistructured data is specified in said database system by a digraph, said set valued function is specified by a path expression and furthermore, said indexing is combined with the use of logical operations on bitmaps to further determine solution sets in said relations specified by other path expressions about said digraph.

5. The method of claim 1, wherein said built dimension table is used to rewrite said query, to an equivalent query referencing said dimension table instead of said set valued function.

6. The method of claim 1, wherein said set valued function and said semistructured data are specified in said database system by a digraph.

7. The method of claim 2, wherein the nodes of said semistructured data are inferred from said relation.

8. The method of claim 1, wherein said set valued function is specified by a conditional expression.

9. The method of claim 1, wherein said set valued function is specified by a logical function created within said database system.

10. The method of claim 1, wherein said built dimension table is dynamically maintained as schema structure of said semistructured data varies within said database system.

11. A computer apparatus for efficient querying of a relation in semistructured data in a database system, said apparatus comprising:
   an extractor for extracting schema structure information from semistructured data in the database system;
   a working dimension table structure formed from (i) a set valued function referencing the semistructured data, (ii) the extracted schema structure information, and (iii) a coloring routine; and
   a query evaluation process executed by the database system, for a query on the relation and the query being conditioned on said set valued function, the query evaluation process using said working dimension table structure joined with the relation to evaluate the query instead of using said set valued function to evaluate the query, the working dimension table effectively serving as an index into the relation.

12. The apparatus of claim 11, wherein said working dimension table provides said database system with pointers for a node in said semistructured data, the pointers being to all rows in a fact table representation of said relation, containing nodes from an output set of said set valued function when applied to said node.

13. The apparatus of claim 12, wherein said pointers are logical bitmaps.

14. The apparatus of claim 13, wherein said semistructured data is specified in said database system by a digraph, said set valued function is specified by a path expression and furthermore, said indexing is combined with the use of logical operations on bitmaps to further determine solution sets in said relations specified by other path expressions about said digraph.

15. The apparatus of claim 12, wherein the nodes of said semistructured data are inferred from said relation.

16. The apparatus of claim 11, wherein said working dimension table structure is used to rewrite queries, to equivalent queries referencing said working dimension table structure instead of said set valued function.

17. The apparatus of claim 11, wherein said set valued function and said semistructured data are specified in said database system by a digraph.

18. The apparatus of claim 11, wherein said set valued function is specified by a conditional expression.

19. The apparatus of claim 11, wherein said set valued function is specified by a logical function created within said database system.

20. The apparatus of claim 11, wherein said working dimension table structure is dynamically maintained as schema structure of said semistructured data varies within said database system.

21. An article of manufacture comprising;
   a program storage medium readable by a computer and tangibly embodying at least one program of instructions executable by said computer;
   the program of instructions when executed by said computer performing steps of;
   extracting schema structure information from semistructured data in a database system;
   facilitating efficient querying of a relation where queries are conditioned on a set valued function referencing said semistructured data, said facilitating being by (a) building a dimension table using said set valued function, extracted schema structure information and a coloring routine (b) joining the dimension table and the relation, and (c) evaluating queries conditioned on said set valued function using said dimension table effectively as an index into the relation instead of using said set valued function.

22. The article of manufacture of claim 21, wherein said dimension table provides said database system with pointers for a node in said semistructured data, the pointers being to all rows in a fact table representation of said relation, containing nodes from an output set of said set valued function when applied to said node.

23. The article of manufacture of claim 22, wherein said pointers are logical bitmaps means.

24. The article of manufacture of claim 23, wherein said semistructured data is specified in said database system by a digraph, said set valued function is specified by a path expression and furthermore, said indexing is combined with the use of logical operations on bitmaps to further determine solution sets in said relations specified by other path expressions about said digraph.

25. The article of manufacture of claim 22, wherein the nodes of said semistructured data are inferred from said relation.

26. The article of manufacture of claim 21, wherein said dimension table is used to rewrite said queries, to equivalent queries referencing said dimension table instead of said set valued function.

27. The article of manufacture of claim 21, wherein said set valued function and said semistructured data are specified in said database system by a digraph.

28. The article of manufacture of claim 21, wherein said set valued function is specified by a conditional expression.

29. The article of manufacture of claim 21, wherein said set valued function is specified by a logical function created within said database system.

30. The article of manufacture of claim 21, wherein said dimension table is dynamically maintained as said semistructured data varies within said database system.

* * * * *